US012776928B2

(12) United States Patent
Chen

(10) Patent No.: US 12,776,928 B2
(45) Date of Patent: Oct. 27, 2026

(54) COMPACT SEGMENT ROUTING MULTICAST FOR IPv6

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 18/754,889

(22) Filed: Jun. 26, 2024

(65) Prior Publication Data

US 2024/0348463 A1 Oct. 17, 2024

Related U.S. Application Data

(63) Continuation of application No. PCT/US2022/047756, filed on Oct. 25, 2022.

(60) Provisional application No. 63/294,012, filed on Dec. 27, 2021.

(51) Int. Cl.

| | |
|---|---|
| ***H04L 12/18*** | (2006.01) |
| ***H04L 45/00*** | (2022.01) |
| ***H04L 45/16*** | (2022.01) |
| ***H04L 45/484*** | (2022.01) |

(52) U.S. Cl.

CPC .............. *H04L 12/18* (2013.01); *H04L 45/16* (2013.01); *H04L 45/34* (2013.01); *H04L 45/484* (2022.05)

(58) Field of Classification Search

CPC ...... H04L 12/2861; H04L 45/16; H04L 12/18

See application file for complete search history.

(56) References Cited

U.S. PATENT DOCUMENTS

| | | | | |
|---|---|---|---|---|
| 9,537,769 | B2 * | 1/2017 | Bryant | H04L 45/74 |
| 10,165,093 | B2 * | 12/2018 | Filsfils | H04L 45/50 |
| 10,454,822 | B2 * | 10/2019 | Nainar | H04L 45/74 |
| 11,025,545 | B2 * | 6/2021 | Enguehard | H04L 47/787 |
| 11,245,617 | B1 * | 2/2022 | Bonica | H04L 45/745 |
| 2015/0256456 | A1 * | 9/2015 | Previdi | H04L 69/166 370/392 |
| 2018/0324090 | A1 * | 11/2018 | Duncan | H04L 12/4641 |
| 2018/0375684 | A1 * | 12/2018 | Filsfils | H04L 67/63 |
| 2020/0044957 | A1 * | 2/2020 | Allan | H04L 41/0816 |
| 2022/0191139 | A1 * | 6/2022 | Dutta | H04L 69/22 |

FOREIGN PATENT DOCUMENTS

| | | |
|---|---|---|
| WO | 2021211209 A1 | 10/2021 |
| WO | 2021257141 A1 | 12/2021 |

OTHER PUBLICATIONS

Li et al. , SPRING Working Group Internet-Draft, Compressed SRv6 Network programming dated Aug. 28, 2020 (Year: 2020).*

H Chen, Stateless SRv6 Point-to-Multipoint Path, draft-chen-pim-srv6-p2mp-path-05, Nov. 11, 2021, 16 pages.

* cited by examiner

*Primary Examiner* — Joe Chacko

(74) *Attorney, Agent, or Firm* — Conley Rose, P.C.

(57) ABSTRACT

A method implemented by an ingress network node in a segment routing (SR) multicast domain along a point-to-multipoint (P2MP) path. The method includes receiving a packet from a traffic source; encapsulating the packet with a segment routing header (SRH) that includes a sub-tree of the P2MP path through the SR multicast domain, where the sub-tree includes a reduced multicast segment identifier (rSID) for a link along the sub-tree; and sending the packet toward the next hop network node based on the rSID of the SRH.

28 Claims, 13 Drawing Sheets

400

0 402 B 404 L+B 406 408 410 127

| | | | | | | |
|---|---|---|---|---|---|---|
| 8 | P1's Multicast Node Locator | 1 | 2 | 7 | Arguments | P1-m |
| 7 | P1's Multicast Node Locator | 2 | 2 | 5 | Arguments | P2-m |
| 6 | P1's Multicast Node Locator | 3 | 1 | 3 | Arguments | P3-m |
| 5 | P1's Multicast Node Locator | 2 | 0 | 0 | Arguments | PE1-m |
| 4 | P1's Multicast Node Locator | 1 | 0 | 0 | Arguments | PE2-m |
| 3 | P1's Multicast Node Locator | 2 | 2 | 2 | Arguments | P4-m |
| 2 | P1's Multicast Node Locator | 1 | 0 | 0 | Arguments | PE3-m |
| 1 | P1's Multicast Node Locator | 3 | 0 | 0 | Arguments | PE4-m |

FIG. 4

500

| 508 | 502 | 504 | 506 | Link | rSID designation | |
|---|---|---|---|---|---|---|
| 16 | 1 | 2 | 14 | PE8 to P1 | P1-m' | |
| 14 | 2 | 2 | 10 | P1 to P2 | P2-m' | |
| 12 | 3 | 1 | 6 | P1 to P3 | P3-m' | |
| 10 | 2 | 0 | 0 | P2 to PE1 | PE1-m' | Sub-trees from P2 |
| 8 | 1 | 0 | 0 | P2 to PE2 | PE2-m' | |
| 6 | 2 | 2 | 4 | P3 to P4 | P4-m' | Sub-trees from P3 |
| 4 | 1 | 0 | 0 | P4 to PE3 | PE3-m' | |
| 2 | 3 | 0 | 0 | P4 to PE4 | PE4-m' | |

FIG. 5

900

| Link number (902) | Multicast SID locator of next hop (904) |
|---|---|
| 1 | PE8's Multicast SID locator |
| 2 | P2's Multicast SID locator |
| 3 | P3's Multicast SID locator |

FIG. 9

1000

```
S01. When an SRH is processed {
S02.   If (Segments Left == 0) {
S03.     Stop processing the SRH, and proceed to process the next header in the packet, whose type is identified by
         the Next Header field in the routing header.
S04.   }
S05.   If (IPv6 Hop Limit <= 1) {
S06.     Send an ICMP Time Exceeded message to the Source Address with Code 0 (Hop limit exceeded in transit),
         interrupt packet processing, and discard the packet.
S07.   }
S08.   max_LE = (Hdr Ext Len / 2) - 1
S09.   If ((Last Entry > max_LE) or (Segments Left > Last Entry+1)) {
S10.     Send an ICMP Parameter Problem to the Source Address with Code 0 (Erroneous header field encountered)
         and Pointer set to the Segments Left field, interrupt packet processing, and discard the packet.
S11.   }
S12.   Decrement IPv6 Hop Limit by 1
S13a.  Duplicate the packet NB times (where NB = N-Branches in the rSID in the DA)
S13b.  FOR (i = 1 to NB) {
S13c.     Set SL of the i-th duplicated packet according to S-rSIDs in the i-th rSID in SRH
S14a.     Set IPv6 DA of the i-th duplicated packet to <Multicast SID locator of Link-No in i-th rSID, i-th rSID>
S15a.     Submit the i-th duplicated packet to the egress IPv6 FIB lookup for transmission to the new destination
S15b.  }
S16. }
```

FIG. 10

1100

```
S01. When an SRH is processed {
S02.    If (Segments Left == 0) {
S03.       Stop processing the SRH, and proceed to process the next header in the packet, whose type is identified by
           the Next Header field in the routing header.
S04.    }
S05.    If (IPv6 Hop Limit <= 1) {
S06.       Send an ICMP Time Exceeded message to the Source Address with Code 0 (Hop limit exceeded in transit),
           interrupt packet processing, and discard the packet.
S07.    }
S08.    max_LE = (Hdr Ext Len / 2) - 1
S09.    If ((Last Entry > max_LE) or (Segments Left > Last Entry+1)) {
S10.       Send an ICMP Parameter Problem to the Source Address with Code 0 (Erroneous header field encountered)
           and Pointer set to the Segments Left field, interrupt packet processing, and discard the packet.
S11.    }
S12.    Decrement IPv6 Hop Limit by 1
S13a.   Duplicate the packet NB times (where NB = N-Branches in the rSID in the DA)
S13b.   FOR (i = 1 to NB) { // MSL-NH: Multicast SID locator of Link-No in i-th rSID in SRH
S13c.      IF (L == 1) THEN {Set SL and IPv6 DA of the i-th duplicated packet to 0 and MSL-NH respectively}
S13d.      ELSE (i.e., L == 0) {Set SL of the i-th duplicated packet according to S-rSIDs in the i-th rSID in SRH
S14a.         Set IPv6 DA of the i-th duplicated packet to <MSL-NH, i-th rSID>}
S15a.      Submit the i-th duplicated packet to the egress IPv6 FIB lookup for transmission to the new destination
S15b.   }
S16. }
```

FIG. 11

COMPACT SEGMENT ROUTING MULTICAST FOR IPv6

CROSS-REFERENCE TO RELATED APPLICATIONS

This patent application is a continuation of International Patent Application No. PCT/US2022/047756 filed on Oct. 25, 2022, which claims the benefit of U.S. Provisional Patent Application No. 63/294,012 filed Dec. 27, 2021, each of which is hereby incorporated by reference.

TECHNICAL FIELD

The present disclosure is generally related to the field of network communication and, in particular, to segment routing (SR) over the Internet Protocol version six (IPv6) data plane (SRv6).

BACKGROUND

SRv6 is a next-generation IP bearer protocol that combines SR and IPv6. Utilizing existing IPv6 forwarding technology, SRv6 implements network programming through flexible IPv6 extension headers.

SRv6 reduces the number of required protocol types, offers great extensibility and programmability, and meets the diversified requirements of more new services. SRv6 also provides high reliability and offers exciting cloud service application potential.

In computer networking, multicast is group communication where data transmission is addressed to a group of destination computers simultaneously. Multicast can be one-to-many or many-to-many distribution. The one-to-many configuration is known as point-to-multipoint (P2MP).

SRv6 and multicast techniques may be used together to generate an SR P2MP path through a network domain. In order to route packets, the SR P2MP path is encoded into a packet header. The packet header includes a plurality of multicast segment identifiers (SIDs).

SUMMARY

The disclosed embodiments provide techniques for SRv6 multicast that use reduced multicast segment identifiers (rSIDs). The rSIDs have a more compact format relative to the multicast SIDs currently being used. By using the rSIDs, the overhead of SRv6 multicast is decreased (e.g., the size of the packet header is reduced) and the efficiency of SRv6 multicast is increased relative to existing techniques.

A first aspect relates to a method implemented by an ingress network node in a segment routing (SR) multicast domain along a point-to-multipoint (P2MP) path, comprising: receiving a packet from a traffic source; encapsulating the packet with a segment routing header (SRH) that includes a sub-tree of the P2MP path through the SR multicast domain, wherein the sub-tree includes a reduced multicast segment identifier (rSID) for a link along the sub-tree; and sending the packet toward a next hop network node based on the rSID of the SRH.

Optionally, in any of the preceding aspects, another implementation of the aspect further comprises duplicating the packet to generate a copy of the packet; encapsulating the copy of the packet with a second SRH that includes a second sub-tree of the P2MP path through the SR multicast domain, wherein the second sub-tree includes a second rSID for a link along the second sub-tree; and sending the copy of the packet toward the second next hop network node based on the second rSID.

Optionally, in any of the preceding aspects, another implementation of the aspect further comprises setting a destination address (DA) of the packet to include: a multicast segment identifier (SID) locator of a next hop network node along the sub-tree, and the rSID for the link along the sub-tree, wherein the rSID includes a link number (Link-No) of the link along the sub-tree, a number of branches (N-Branches) of the next hop network node along the sub-tree, and a size of rSIDs (S-rSIDs) for rSIDs starting from an rSID for a first link from the next hop network node along the sub-tree.

Optionally, in any of the preceding aspects, another implementation of the aspect provides that the rSID is about two bytes and includes a Link-No field, an N-Branches field, and an S-rSIDs field.

Optionally, in any of the preceding aspects, another implementation of the aspect provides that the Link-No field includes a value indicating the link number of the link along the sub-tree, the N-Branches field includes a value indicating the number of branches of the next hop network node along the sub-tree, and the S-rSIDs field includes a value indicating the size of the rSIDs starting from the rSID for the first link from the next hop network node along the sub-tree.

Optionally, in any of the preceding aspects, another implementation of the aspect provides that the sub-tree includes a third rSID with an L flag, and wherein, when the L flag is set to a first value, the L flag indicates that the third rSID is for a link to a leaf node, that the third rSID has no corresponding N-Branches field, and that the third rSID has no corresponding S-rSIDs field.

Optionally, in any of the preceding aspects, another implementation of the aspect provides that the sub-tree includes a fourth rSID with an E flag, and wherein, when the E flag is set to a first value, the E flag indicates that a Link-No field of the fourth rSID has been extended relative to a size of the Link-No field of the rSID.

Optionally, in any of the preceding aspects, another implementation of the aspect provides that the SRH includes a segment left (SL) set to a number of normal segments used for the S-rSIDs field in the rSID for the link along the sub-tree and rSIDs for links for sub-trees from the next hop network node along the P2MP path, and wherein each of the normal segments comprises 16 bytes.

A second aspect relates to a method implemented by a transit network node in a segment routing (SR) multicast domain along a point-to-multipoint (P2MP) path, comprising: receiving a packet with a segment routing header (SRH) and a destination address (DA), wherein the SRH includes sub-trees from the transit network node, and wherein the DA includes a multicast segment identifier (SID) locator of the transit network node, a number of branches (N-Branches) field with a value indicating a number of the sub-trees from the transit network node, and a size of a reduced multicast segment identifiers (S-rSIDs) field with a value indicating a start of the sub-trees; duplicating the packet to generate a copy of the packet for each of the sub-trees, wherein a sub-tree of the sub-trees includes a reduced multicast segment identifier (rSID) for a link along the sub-tree; and sending the copy of the packet toward a next hop network node based on the rSID.

Optionally, in any of the preceding aspects, another implementation of the aspect further comprises setting a DA of the copy of the packet to include: a SID locator of the next hop network node along the sub-tree, wherein the SID locator is obtained from a neighbor SID table of the transit network node using a link number in the rSID; and the rSID for the link along the sub-tree, wherein the rSID includes a number of branches (N-Branches) of the next hop network node along the sub-tree and a size of rSIDs (S-rSIDs) for rSIDs starting from an rSID for a first link from the next hop node along the sub-tree.

Optionally, in any of the preceding aspects, another implementation of the aspect provides that the rSID is about two bytes and the rSID consists of a link number (Link-No) field, a number of branches (N-Branches) field, and a size of rSIDs (S-rSIDs) field.

Optionally, in any of the preceding aspects, another implementation of the aspect provides that the Link-No field includes a value indicating a link number for a link from the transit network node to a next hop network node along the sub-tree, the N-Branches field includes a value indicating a number of branches of the next hop network node along the sub-tree, and the S-rSIDs field includes a value indicating a size of the rSIDs starting from the rSID for the first link from the next hop node along the sub-tree.

Optionally, in any of the preceding aspects, another implementation of the aspect provides that the sub-tree includes a second rSID with an L flag, and wherein, when the L flag is set to a first value, the L flag indicates that the second rSID is for a link to a leaf node, that the second rSID has no corresponding N-Branches field, and that the second rSID has no corresponding S-rSIDs field.

Optionally, in any of the preceding aspects, another implementation of the aspect provides that the sub-tree includes a third rSID with an E flag, and wherein, when the E flag is set to a first value, the E flag indicates that a Link-No field of the third rSID has been extended relative to a size of the Link-No field of the rSID.

Optionally, in any of the preceding aspects, another implementation of the aspect provides that the SRH of the copy of the packet includes a segment left (SL) set to a number of normal segments used for the S-rSIDs field in the rSID for the link from the transit network node to a next hop network node along the sub-tree and rSIDs for links for sub-trees from the next hop network node along the P2MP path, and wherein each of the normal segments comprises 16 bytes.

A third aspect relates to an ingress network node in a segment routing (SR) multicast domain along a point-to-multipoint (P2MP) path, comprising: a memory storing instructions; and a processor coupled to the memory, the processor configured to execute the instructions to cause the ingress network node to: receive a packet from a traffic source; encapsulate the packet with a segment routing header (SRH) that includes a sub-tree of the P2MP path through the SR multicast domain, wherein the sub-tree includes a reduced multicast segment identifier (rSID) for a link along the sub-tree; and send the packet toward a next hop network node based on the rSID of the SRH.

Optionally, in any of the preceding aspects, another implementation of the aspect provides that the processor is further configured to: duplicate the packet to generate a copy of the packet; encapsulate the copy of the packet with a second SRH that includes a second sub-tree of the P2MP path through the SR multicast domain, wherein the second sub-tree includes a second rSID for a link along the second sub-tree; and send the copy of the packet toward the second next hop network node based on the second rSID.

Optionally, in any of the preceding aspects, another implementation of the aspect provides that the processor is further configured to set a destination address (DA) of the packet to include: a multicast segment identifier (SID) locator of the next hop network node along the sub-tree, and the rSID for the link along the sub-tree, wherein the rSID includes a link number (Link-No) of the link along the sub-tree, a number of branches (N-Branches) of the next hop network node along the sub-tree, and a size of rSIDs (S-rSIDs) for rSIDs starting from an rSID for a first link from the next hop network node along the sub-tree.

Optionally, in any of the preceding aspects, another implementation of the aspect provides that the rSID is about two bytes and includes a Link-No field, an N-Branches field, and an S-rSIDs field.

Optionally, in any of the preceding aspects, another implementation of the aspect provides that the Link-No field includes a value indicating the link number of the link along the sub-tree, the N-Branches field includes a value indicating the number of branches of the next hop network node along the sub-tree, and the S-rSIDs field includes a value indicating the size of the rSIDs starting from the rSID for the first link from the next hop network node along the sub-tree.

Optionally, in any of the preceding aspects, another implementation of the aspect provides that the sub-tree includes a third rSID with an L flag, and wherein, when the L flag is set to a first value, the L flag indicates that the third rSID is for a link to a leaf node, that the third rSID has no corresponding N-Branches field, and that the third rSID has no corresponding S-rSIDs field.

Optionally, in any of the preceding aspects, another implementation of the aspect provides that the sub-tree includes a fourth rSID with an E flag, and wherein, when the E flag is set to a first value, the E flag indicates that a Link-No field of the fourth rSID has been extended relative to a size of the Link-No field of the rSID.

Optionally, in any of the preceding aspects, another implementation of the aspect provides that the SRH includes a segment left (SL) set to a number of normal segments used for the S-rSIDs field in the rSID for the link along the sub-tree and rSIDs for links for sub-trees from the next hop network node along the P2MP path, and wherein each of the normal segments comprises 16 bytes.

A fourth aspect relates to a transit network node in a segment routing (SR) multicast domain along a point-to-multipoint (P2MP) path, comprising: a memory storing instructions; and a processor coupled to the memory, the processor configured to execute the instructions to cause the transit network node to: receive a packet with a segment routing header (SRH) and a destination address (DA), wherein the SRH includes sub-trees from the transit network node, and wherein the DA includes a multicast segment identifier (SID) locator of the transit network node, a number of branches (N-Branches) field with a value indicating a number of the sub-trees from the transit network node, and a size of a reduced multicast segment identifier (S-rSIDs) field with a value indicating a start of the sub-trees; duplicate the packet to generate a copy of the packet for each of the sub-trees, wherein a sub-tree of the sub-trees includes a reduced multicast segment identifier (rSID) for a link along the sub-tree; and send the copy of the packet toward a next hop network node based on the rSID.

Optionally, in any of the preceding aspects, another implementation of the aspect provides that the processor is further configured to set a DA of the copy of packet to include: a SID locator of the next hop network node along the sub-tree, wherein the SID locator is obtained from a neighbor SID table of the transit network node using a link number in the rSID; and the rSID for the link along the sub-tree, wherein the rSID includes a number of branches (N-Branches) of the next hop network node along the sub-tree and a size of rSIDs (S-rSIDs) for rSIDs starting from an rSID for a first link from the next hop node along the sub-tree.

Optionally, in any of the preceding aspects, another implementation of the aspect provides that the rSID is about two bytes and consists of a link number (Link-No) field, a number of branches (N-Branches) field, and a size of rSIDs (S-rSIDs) field.

Optionally, in any of the preceding aspects, another implementation of the aspect provides that the Link-No field includes a value indicating a link number for a link from the transit network node to a next hop network node along the sub-tree, the N-Branches field includes a value indicating a number of branches of the next hop network node along the sub-tree and the S-rSIDs field includes a value indicating a size of the rSIDs starting from the rSID for the first link from the next hop node along the sub-tree.

Optionally, in any of the preceding aspects, another implementation of the aspect provides that the sub-tree includes a second rSID with an L flag, and wherein, when the L flag is set to a first value, the L flag indicates that the second rSID is for a link to a leaf node, that the second rSID has no corresponding N-Branches field, and that the second rSID has no corresponding S-rSIDs field.

Optionally, in any of the preceding aspects, another implementation of the aspect provides that the sub-tree includes a third rSID with an E flag, and wherein, when the E flag is set to a first value, the E flag indicates that a Link-No field of the third rSID has been extended relative to a size of the Link-No field of the rSID.

Optionally, in any of the preceding aspects, another implementation of the aspect provides that the SRH of the copy of the packet includes a segment left (SL) set to a number of normal segments used for the S-rSIDs field in the rSID for the link from the transit network node to a next hop network node along the sub-tree and rSIDs for links for sub-trees from the next hop network node along the P2MP path, and wherein each of the normal segments comprises 16 bytes.

A fifth aspect relates to a non-transitory computer readable medium comprising a computer program product for use by an ingress network node, the computer program product comprising computer executable instructions stored on the non-transitory computer readable medium that, when executed by one or more processors, cause the ingress network node to execute one or more of the disclosed embodiments.

A sixth aspect relates to a non-transitory computer readable medium comprising a computer program product for use by a transit network node, the computer program product comprising computer executable instructions stored on the non-transitory computer readable medium that, when executed by one or more processors, cause the transit network node to execute one or more of the disclosed embodiments.

A seventh aspect relates to an ingress network node in a segment routing (SR) multicast domain along a point-to-multipoint (P2MP) path, comprising: means for receiving a packet from a traffic source; means for encapsulating the packet with a segment routing header (SRH) for a sub-tree of the P2MP path through the SR multicast domain, wherein the sub-tree includes a reduced multicast segment identifier (rSID) for a link along the sub-tree; and means for sending the packet toward the next hop network node based on the rSID.

An eighth aspect relates to a transit network node in a segment routing (SR) multicast domain along a point-to-multipoint (P2MP) path, comprising: means for receiving a packet with a segment routing header (SRH) and a destination address (DA), wherein the SRH includes sub-trees from the transit network node, and wherein the DA includes a multicast segment identifier (SID) locator of the transit network node, a number of branches (N-Branches) field with a value indicating a number of the sub-trees from the transit network node, and a size of a reduced multicast segment identifier (S-rSIDs) field with a value indicating a start of the sub-trees; means for duplicating the packet to generate a copy of the packet for each of the sub-trees, wherein a sub-tree of the sub-trees includes a reduced multicast segment identifier (rSID) for a link along the sub-tree; and means for sending the copy of the packet toward a next hop network node based on the rSID.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a segment list encoding sub-tree from an ingress network node via a next hop to egress nodes.

FIG. 5 is an encoding sub-tree from an ingress network node via a next hop to egress nodes according to an embodiment of the disclosure.

FIG. 9 is a multicast neighbor SID table of a next hop node according to an embodiment of the disclosure.

FIG. 10 is an example of pseudocode for processing a segment routing header (SRH) without using the L flag according to an embodiment of the disclosure.

FIG. 11 is an example of pseudocode for processing an SRH using the L flag according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Unfortunately, the SRH with multicast SIDs encoding an SR P2MP path is relatively large. This is due to the size of the multicast SIDs, which are 128 bits each. The size of the multicast SIDs in the SRH increases the overhead of SR multicast, which decreases the efficiency of SR multicast.

Disclosed herein are techniques for SRv6 multicast that use reduced multicast segment identifiers (rSIDs). The rSIDs have a more compact format (e.g., about two bytes) relative to the multicast SIDs currently being used. By using the rSIDs, the overhead of SRv6 multicast is decreased (e.g., the size of the packet header is reduced) and the efficiency of SRv6 multicast is increased relative to existing techniques.

Figure 1:
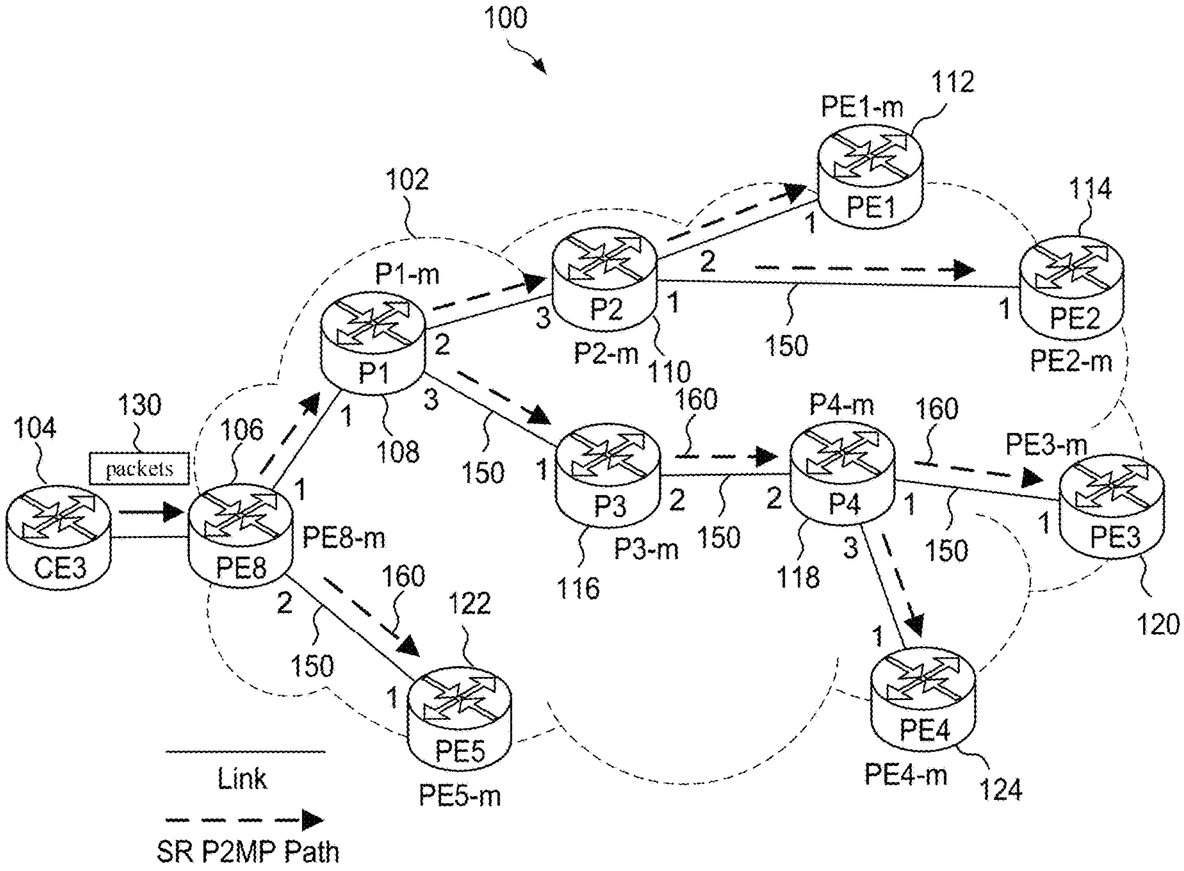
FIG. 1 is a schematic diagram of an SRv6 network topology including an SRv6 multicast domain.

FIG. 1 is a schematic diagram of an SRv6 network topology 100 including an SRv6 multicast domain 102. The SRv6 multicast domain 102 receives packets 130 from a content source 104. The content source 104 may be a network node, a server, a data center, or other telecommunications device configured to receive and respond to requests for content. The SRv6 multicast domain 102 comprises a plurality of network nodes 106, 108, 110, 112, 114, 116, 118, 120, 122, and 124. While ten network nodes 104-124 are shown in the SRv6 multicast domain 102, more or fewer nodes may be included in practical applications.

Each of the network nodes 106-124 comprises a router, switch, or other telecommunications device configured to receive, route, store, and transmit packets 130. Some of the network nodes, namely the network nodes 106, 112, 114, 120, 122, and 124, are disposed at an edge of the SRv6 multicast domain 102. The network nodes 106, 112, 114, 120, 122, and 124 receiving multicast packets from outside the SRv6 multicast domain 102 may be referred to as an ingress network node (or simply, an ingress node). The network nodes 106, 112, 114, 120, 122, and 124 transmitting multicast packets out of the SRv6 multicast domain 102 may be referred to as an egress network node (or simply, an egress node). Depending on the direction of multicast packet traffic, each of the network nodes 106, 112, 114, 120, 122, and 124 may function as an ingress network node or an egress network node.

For ease of reference, the various network nodes have been given a letter and number designation. For example, the content source 104 is designated CE3, the network node 106 is designated PE8, the network node 108 is designated P1, and so on.

The network nodes 104-124 in FIG. 1 are coupled to, and communicate with each other, via links 150. The links 150 may be wired, wireless, or some combination thereof. In an embodiment, each of the links 150 may have a cost. The cost of each of the links 150 may be the same or different, depending on the SRv6 network topology 100 and the conditions therein.

Using the various links 150, an SR P2MP path 160 may be established through the SRv6 multicast domain 102. The SR P2MP path 160 is used to distribute the packets 130 within the SRv6 multicast domain 102 to the entity or device (not shown) that requested the content included in the packets 130.

In an embodiment, each network node 106-124 in the SRv6 multicast domain 102 is assigned a unique multicast segment identifier (SID). For example, the network nodes 106-124 in FIG. 1 are designated PE8, P1 to P4, and PE1 to PE5. Thus, the network nodes 106-124 are assigned the multicast SIDs PE8-*m*, P1-*m* to P4-*m*, and PE1-*m* to PE5-*m*, respectively. The multicast SIDs may be obtained from a block of the SIDs containing PE8-*m*, P1-*m*, P2-*m*, P3-*m*, P4-*m*, PE1-*m*, PE2-*m*, PE3-*m*, PE4-*m*, and PE5-*m*. That is, the SID block contains each of the multicast SIDs assigned for the SRv6 multicast domain 102.

When a node (e.g., network node 106) receives a packet (e.g., one of the packets 130) with a destination address (DA) matching a multicast SID of the node, the node duplicates the packet received from an incoming interface and delivers the duplicated packet to each of the multiple outgoing interfaces along the SR P2MP path 160. The SR P2MP path 160 may be referred to as the SR P2MP tree, each segment of the SR P2MP tree from a node via a link towards the egress nodes of the SR P2MP tree may be referred to as a branch, and each egress network node may be referred to as a leaf (or one of the leaves).

The SR P2MP path 160 from the ingress network node 106 to the egress network nodes 112, 114, 120, 122, and 124 is encoded in a segment list of a segment routing header (SRH) and sent to the ingress network node 106. For a packet 130 received by the ingress network node 106, the ingress encapsulates packet 130 in a SRH containing the SR P2MP tree. For example, the SR P2MP path 160 in FIG. 1 comprises multicast SIDs P1-*m*, P2-*m*, P3-*m*, P4-*m*, and PE1-*m* to PE5-*m*. These SIDs are pushed into the segment list of the SRH of the packet 130 at the ingress network node 106 designated PE8. The packet 130 received from the multicast source (e.g., network node 104 designated CE3) is imported into the SR P2MP path 160 at the ingress network node 106 and sent to the egress network nodes 112, 114, 120, 122, and 124 of the SR P2MP path 160 along the SR P2MP path 160. For example, in FIG. 1, the packet 130 from the multicast source is imported into the SR P2MP path 160 at the ingress network node 106 (PE8) and sent to the egress network nodes 112, 114, 120, 122, and 124 (PE1 to PE5) along the SR P2MP path 160. The overhead of a segment of the SR P2MP path 160 (a.k.a., a sub-tree) from the network node 106 (PE8) via the network node 108 (P1) towards the egress network nodes (PE1 to PE4) is eight SIDs of 16 bytes each, which is a total of 128 bytes.

Figure 2:
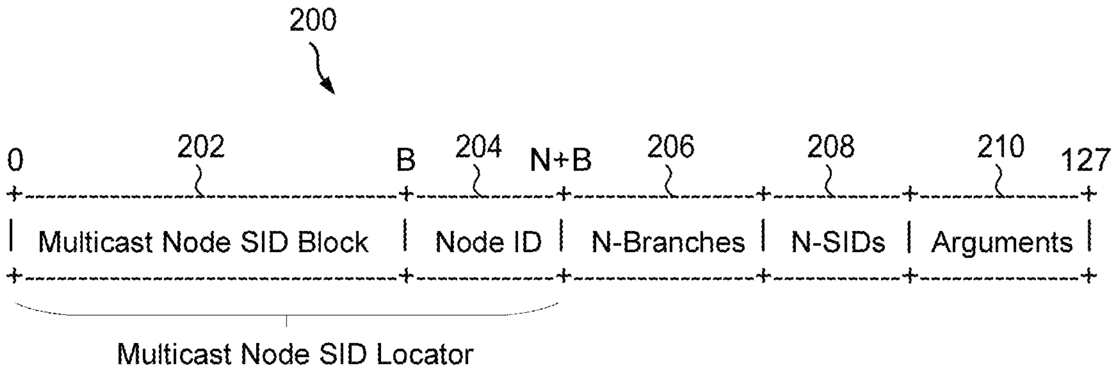
FIG. 2 is a multicast node segment identifier (SID) with branch and sub-tree information according to an embodiment of the disclosure.

FIG. 2 is a multicast node segment identifier (SID) 200 with branch and sub-tree information according to an embodiment of the disclosure. For each node in a network domain, a multicast node SID 200 is allocated from the multicast SID block to the node, which is globally unique.

In an embodiment, a network administrator configures the multicast node SID 200 for every node and distributes the multicast node SID 200 in the domain. In an embodiment, a central controller allocates a multicast node SID 200 for each node and sends the information about the multicast node SID 200 to a node being controlled by the controller. That node may distribute the information in the domain.

The multicast node SID 200 of FIG. 2 comprises 128 bits. The multicast node SID 200 comprises a multicast node SID block field 202 of B bits (i.e., the common prefix of the multicast node SIDs) and a node identifier (ID) field 204 of N bits. The multicast node SID block field 202 includes the common prefix allocated for the multicast node SIDs. The node ID field 204 includes the identifier of a node, which is globally unique. The multicast node SID block field 202 and the node ID field 204 collectively form a Multicast Node SID Locator (or Multicast Node Locator) for short. In an embodiment, the open path shortest first (OPSF) router ID of 32-bits for a node is used for the identifier of the node.

The multicast node SID 200 further includes a number of branches (N-branches) field 206. The number of branches field 206 (or say sub-trees, links, or next hops) indicates the number of branches along the multicast tree from the node receiving the packet with the multicast SID having the destination address (DA) that belongs to the node. When the node receives the packet with its multicast SID (either multicast node SID or multicast adjacency SID) as DA transported by an SR P2MP path or tree, the SID comprises the number of branches along the P2MP path/tree from the node. In one embodiment, the number of branches is included in the SRv6 SID as an argument of a 128-bit SID.

The multicast node SID 200 further includes a number of the SIDs (N-SIDs) field 208. The N-SIDs field 208 indicates the number of SIDs in the sub-trees from the node and the SIDs following them. The N-SIDs field 208 acts as a pointer pointing to a start of the sub-tress. In an embodiment, the N-SIDs field 208 field is included in the SRv6 SID as an argument of a 128-bit SID.

In an embodiment, the multicast node SID 200 further includes an argument field 210 and a functions field (not shown).

Figure 3:
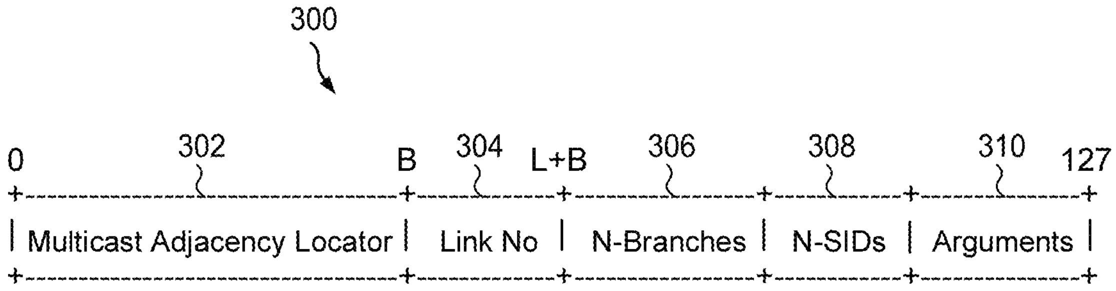
FIG. 3 is a multicast adjacency SID with branch and sub-tree information according to an embodiment of the disclosure.

FIG. 3 is a multicast adjacency SID 300 with branch and sub-tree information according to an embodiment of the disclosure. For each node in a network domain, every (multicast) link (or say interface) connected to the node has a multicast segment identifier (SID), which is called Multicast Adjacency Segment Identifier. A multicast adjacency SID is relative to a specific node. Thus, the multicast adjacency SID is locally significant.

Every node in the network domain assigns a multicast SID from the multicast SID block to each of its links as the multicast adjacency SID for the link and advertises the information about the SID and its link. In an embodiment, for every node, a central controller assigns a multicast SID from the multicast SID block to each link of the node as the multicast adjacency SID for the link and sends the information about the SID and its link to the node and the neighbors of the node.

The multicast adjacency SID 300 of FIG. 3 comprises 128 bits. The multicast adjacency SID 300 comprises a multicast adjacency SID locator field 302 of B bits and a link number (Link No) field 304 of L bits. A multicast adjacency (SID) locator is also called multicast adjacency locator for short. The multicast adjacency SID locator field 302 for a node locates the node, which includes the common prefix allocated for the multicast adjacency SIDs and the specific prefix to the node such as the ID of the node. The link number field 304 includes the link sequence number assigned to every link of a node. In an embodiment, for all n links of a node, link sequence number (or link number for short) 1, 2, . . . , n is assigned to the n links, respectively.

The multicast adjacency SID 300 further includes a number of branches (N-branches) field 306. The number of branches field 306 (or say sub-trees, links, or next hops) indicates the number of branches along the multicast tree from the node receiving the packet with the multicast SID having the DA that belongs to the node. When the node receives the packet with its multicast SID (either multicast node SID or multicast adjacency SID) as DA transported by an SR P2MP path or tree, the SID comprises the number of branches along the P2MP path/tree from the node. In one embodiment, the number of branches is included in the SRv6 SID as an argument of a 128-bit SID.

The multicast adjacency SID 300 further includes a number of the SIDs (N-SIDs) field 308. The N-SIDs field 308 indicates the number of SIDs in the sub-trees from the node and the SIDs following them. The N-SIDs field 308 acts as a pointer pointing to a start of the sub-tress. In an embodiment, the N-SIDs field 208 field is included in the SRv6 SID as an argument of a 128-bit SID.

In an embodiment, the multicast adjacency SID 300 also comprises an argument field 310 and function field (not shown).

For a sub-tree (ST) of an SR P2MP path/tree from the ingress node of the P2MP path/tree, suppose that the multicast SID of a next hop node NH of the ingress is mSID, there are B branches (i.e., outgoing interfaces) to the next hop node BNHj (j=1, . . . , B) from node NH along the sub-tree, the multicast SID of BNHj is mSID-j, and SidSeq-j (j=1, . . . , B) is the SID sequence in the segment list encoding the sub-trees from node BNHj.

The sub-tree (ST) is encoded as segment list <mSID, mSID-1, . . . , mSID-B, SidSeq-1, . . . , SidSeq-B>, where mSID contains the number of branches from node NH in its N-Branches field, which is B, and the number of SIDs in its N-SIDs field, which is the number of the SIDs encoding the sub-trees from NH, i.e., the number of the SIDs following mSID (i.e., B plus the number of the SIDs in SidSeq-1, . . . , SidSeq-B).

mSID-j (j=1, . . . , B) contains the number of branches from node BNHj in its N-Branches field, and the number of the SIDs in its N-SIDs field, which is the number of the SIDs in SidSeq-j (encoding the sub-trees from node BNHj) plus the number of the SIDs following SidSeq-j (i.e., the number of the SIDs in SidSeq-j to SidSeq-B).

For the multicast SID of a leaf in an SR P2MP path/tree, both its N-Branches field and N-SIDs field are zero.

For nodes P1, P2, P3, P4, PE1, PE2, PE3, PE4, and PE5 in FIG. 1, each node is assigned a multicast node SID. The multicast node SID assigned to node X is named X-m. For example, node P1 is assigned a multicast node SID P1-*m*. P2-*m*, P3-*m*, P4-*m*, PE1-*m*, PE2-*m*, PE3-*m*, PE4-*m*, and PE5-*m* are the multicast node SIDs that are assigned to nodes P2, P3, P4, PE1, PE2, PE3, PE4, and PE5, respectively.

For nodes P1, P2, P3, P4, PE1, PE2, PE3, PE4, and PE5 in FIG. 1, the links/interfaces connected to each of the nodes are assigned multicast adjacency SIDs. The multicast adjacency SID assigned to each of the n links of Node X is named X-im (i=1, . . . , n). For example, there are three links connected to node P1. Multicast adjacency SIDs P1-1*m*, P1-2*m* and P1-3*m* are assigned to these three links, respectively. There is one link connected to node PE2. Multicast adjacency SID PE2-1*m* is assigned to the link.

FIG. 4 is a segment list encoding sub-tree 400 from an ingress network node via a next hop to egress nodes. In the illustrated embodiment, the ingress network node is PE8, the next hop is P1, and the egress nodes are PE1 to PE4.

The segment list encoding sub-tree 400 includes a multicast node locator field 402, a link number field 404, a number of branches field 406, a number of SIDs field 408, and an arguments field 410. The multicast node locator field 402 is similar to the multicast node locator (i.e., the multicast node SID block field 202 and the node ID field 204) in FIG. 2. The link number field 404 is similar to the link number field 304 in FIG. 3. The number of branches field 406 is similar to the number of branches fields 206, 306 in FIGS. 2-3, the number of SIDs field 408 is similar to the number of SIDs fields 208, 308 in FIGS. 2-3, and the arguments field 410 is similar to the arguments fields 210, 310 in FIGS. 2-3.

FIG. 5 is an encoding sub-tree 500 from an ingress network node via a next hop to egress nodes according to an embodiment of the disclosure. In the illustrated embodiment, the ingress network node is PE8, the next hop is P1, and the egress nodes are PE1 to PE4.

In an embodiment, the sub-tree from PE8 via P1 towards PE1 to PE4 in FIG. 1 is represented in FIG. 5 using reduced SIDs (rSIDs). In an embodiment, an rSID comprises a Link number (Link-No) field 502, a number of branches (N-Branches) field 504, and size of rSIDs (S-rSIDs) field 506. The Link-No field 502 has a value for the link number of the link from node U to node D on the sub-tree. The N-Branches field 504 has a value indicating the number of branches/links/sub-trees from node D on the sub-tree. The S-rSIDs field 506 has a value indicating the size of the rSIDs under the link from node D. An rSID for the link from node U to node D is designated D-*m'*.

In an embodiment, an rSID occupies about two (2) bytes to represent a link on the sub-tree. In an embodiment, about 2 bytes means 16 bits or less. In an embodiment, about 2 bytes means any number of bits up to and including 16 bits. In an embodiment, about 2 bytes means between 2 bits and 16 bits. In an embodiment, about 2 bytes means 12 bits, 13 bits, 14 bits, 15 bits, 16 bits, 17 bits, 18 bits, 19 bits, or 20 bits.

As shown in FIG. 5, the rSID for the link from PE8 to P1 is designated P1-*m*'. The rSID P1-*m*' comprises a link number field 502 with the value of 1 indicating the link number of the link, a number of branches field 504 with the value of 2 indicating there are 2 branches/links/sub-trees from node P1, and an S-rSIDs field 506 with the value of 14 indicating the size of the rSIDs under the link from P1 is 14 bytes. The value of 14 acts as a pointer pointing to a start of the sub-trees from P1.

The rSID for the link from P1 to P2 is designated P2-*m*'. The rSID P2-*m*' comprises a link number field 502 with the value of 2 indicating the link number of the link, a number of branches field 504 with the value of 2 indicating there are 2 branches/links/sub-trees from node P2, and an S-rSIDs field 506 with the value of 10 indicating the size of the rSIDs under the link from P2 is 10 bytes. The value of 10 acts as a pointer pointing to the sub-trees from P2.

The rSID for the link from P1 to P3 is designated P3-*m*'. The rSID P3-*m*' comprises a link number field 502 with the value of 3 indicating the link number of the link, a number of branches field 504 with the value of 1 indicating there is 1 branch/link/sub-tree from node P3, and an S-rSIDs field 506 with the value of 6 indicating the size of the rSIDs under the link from P3 are 6 bytes. The value of 6 acts as a pointer pointing to the sub-tree from P3.

The rSID for the link from P2 to PE1 is designated PE1-*m*'. The rSID PE1-*m*' comprises a link number field 502 with the value of 2 indicating the link number of the link. The number of branches field 504 and the S-rSIDs field 506 each have a value of 0 indicating there is no branch/link/sub-tree from node PE1.

Figure 6:
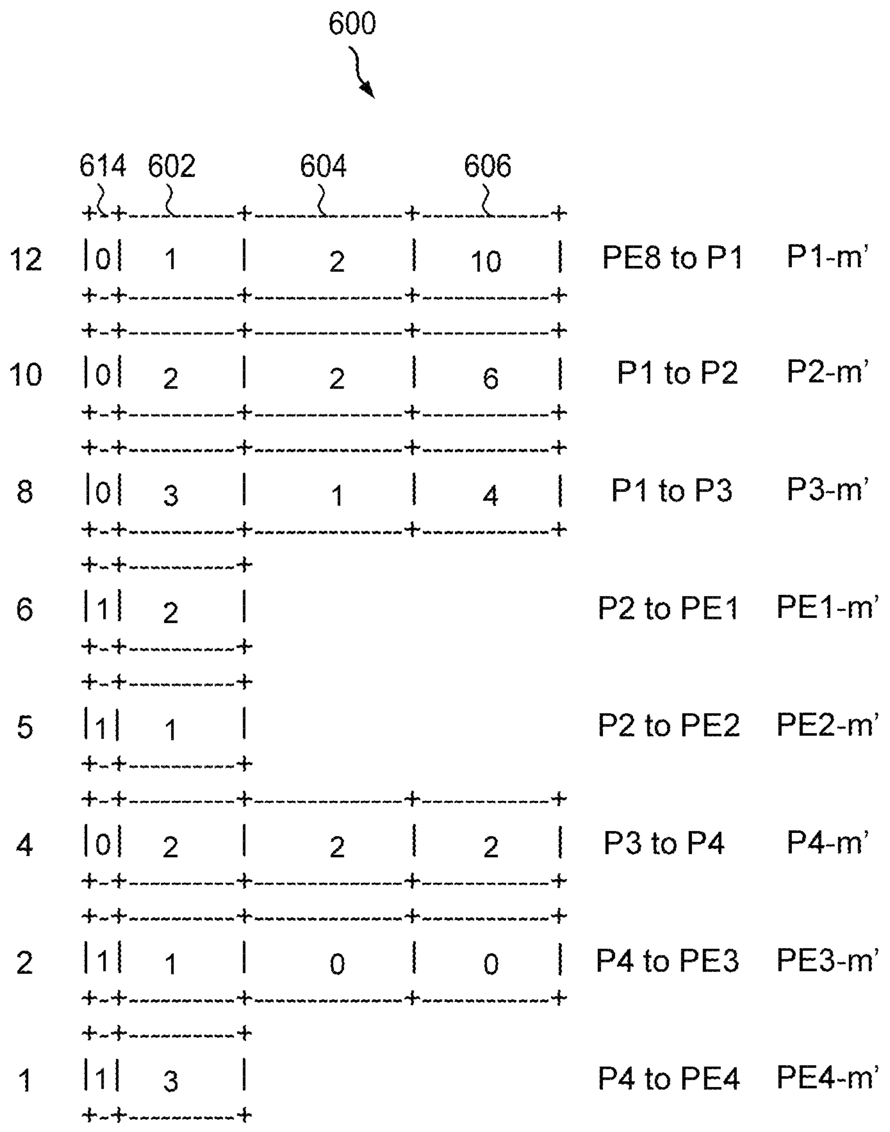
FIG. 6 is an encoding sub-tree from an ingress network node via a next hop to egress nodes using an L flag according to an embodiment of the disclosure.

FIG. 6 is an encoding sub-tree 600 from an ingress network node via a next hop to egress nodes using an L flag according to an embodiment of the disclosure. In the illustrated embodiment, the ingress network node is PE8, the next hop is P1, and the egress nodes are PE1 to PE4.

In an embodiment, the sub-tree from PE8 via P1 towards PE1 to PE4 in FIG. 1 is represented in FIG. 6 using reduced SIDs (rSIDs). In an embodiment, an rSID comprises a Link number (Link-No) field 602, a number of branches (N-Branches) field 604, and size of rSIDs (S-rSIDs) field 606. The Link-No field 602 has a value for the link number of the link from node U to node D on the sub-tree. The N-Branches field 604 has a value indicating the number of branches/links/sub-trees from node D on the sub-tree. The S-rSIDs field 606 has a value indicating the size of the rSIDs under the link from node D. An rSID for the link from node U to node D is designated D-*m'*.

Relative to the encoding sub-tree 500 of FIG. 5, the encoding sub-tree 600 of FIG. 6 is improved by using an L flag in the L flag field 614 in one or more of the rSIDs. When set to a particular value (e.g., 1), the L flag in the L flag field 614 indicates that the corresponding rSID is for a link to a leaf node and, as such, the number of branches field 604 and the size of the rSIDs field 606 have been removed from the corresponding rSID.

For example, assume that the L flag field 614 and the link number field 602 occupy 1 byte, and that the number of branches field 604 and the size of the rSIDs field 606 occupy another 1 byte. Keeping this in mind, the value of the L flag in the L flag field 614 corresponding to the rSID P1-*m*' for the link from PE8 to P1 has a value of 0 (i.e., is set to zero). This indicates that P1 is not a leaf node. The link number field 602 has a value of 1 to indicate the link number of the link. The number of branches field 604 has a value of 2 to indicate there are two branches/links/sub-trees from node P1. The size of the rSIDs field 606 has a value of 10 to indicate the size of the rSIDs under the link from P1 (i.e., the rSIDs: P2-*m*', P3-*m*', PE1-*m*', PE2-*m*', P4-*m*', PE3-*m*' and PE4-*m*') is 10 bytes, which acts as a pointer pointing to the sub-trees from P1 (i.e., the start of the first sub-tree from P1). Thus, 2 bytes are used to encode this rSID.

The value of the L flag in the L flag field 614 corresponding to the rSID P2-*m*' for the link from P1 to P2 also has a value of 0. This indicates that P2 is not a leaf node. The link number field 602 has a value of 2 to indicate the link number of the link. The number of branches field 604 has a value of 2 to indicate there are two branches/links/sub-trees from node P2. The size of the rSIDs field 606 has a value of 6 to indicate the size of the rSIDs under the link from P2 (i.e., the rSIDs: PE1-*m*', PE2-*m*', P4-*m*', PE3-*m*' and PE4-*m*') is 6 bytes, which acts as a pointer pointing to the sub-trees from P2 (i.e., the start of the first sub-tree from P2). Again, 2 bytes are used to encode this rSID.

In contrast to the above, the value of the flag in the L flag field 614 corresponding to the rSID PE1-*m*' for the link from P2 to PE1 has a value of 1 (i.e., is set to one). This indicates that PE1 is a leaf node (a.k.a., egress node). The link number field 602 has a value of 2 to indicate the link number of the link. However, because of the value of the L flag in the L flag field 614 is 1, the rSID PE1-*m*' does not include the number of branches field 604 or the size of the rSIDs field 606. Thus, only 1 byte is used to encode this rSID. Other rSIDs in FIG. 6 having an L flag in the L flag field 614 with a value of 1 also need only 1 byte to be encoded. Therefore, the encoding sub-tree 600 of FIG. 6 uses fewer bytes relative to the encoding sub-tree 500 of FIG. 5.

Figure 7A:
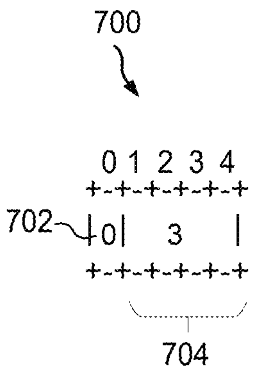
FIG. 7A is a link number (Link-No) field of an rSID with an E flag set to a first value according to an embodiment of the disclosure.

FIG. 7A is a link number (Link-No) field 700 of an rSID with an E flag set to a first value (e.g., 0) according to an embodiment of the disclosure. As will be explained more fully below, the encoding sub-tree 600 in FIG. 6 may be further improved by adding the E flag into the link number field 700 of the rSID.

As shown, the link number field 700 includes an E flag field 702 and a basic field 704 corresponding to an rSID. In an embodiment, the E flag field 702 comprises one bit and the basic field 704 comprises four bits. The E flag field 702 comprises one bit and includes an E flag. The basic field 704 includes a value that represents a particular link.

When the E flag in the E flag field 702 is set to 0, the basic field 704 includes a limited number of bits (e.g., 4 bits) that may be used to represent the link number. For example, assume the link number is 3. This link number can be represented in binary as 0111 using the four available bits. However, when the link number is a larger (e.g., 4088), this number cannot be represented in four bits. Indeed, the number 4088 represented in binary is 111111111000, which will not fit within the basic field 704 comprising four bits.

Figure 7B:
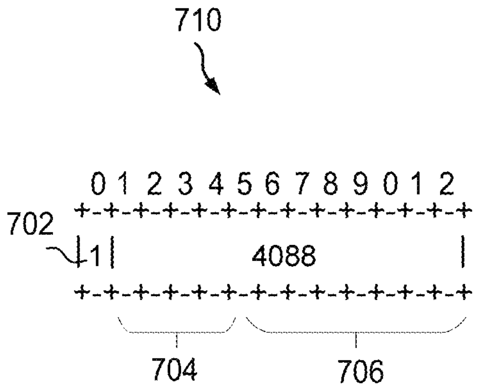
FIG. 7B is a link number field of an rSID with the E flag set to a second value according to an embodiment of the disclosure.

FIG. 7B is a link number field 710 of an rSID with the E flag set to a second value (e.g., 1) according to an embodiment of the disclosure. To resolve the issue of the link number being too large for the basic field 704 of FIG. 7A, the value of the E flag in the E flag field 702 is set to 1 in FIG. 7B to indicate that the link number field 710 includes both the basic field 704 and an extended field 706. The extended field 706 may be, for example, eight bits. The four bits from the basic field 704 and the eight bits of the extended field 706 provide a combined twelve bits, which is sufficient to include the larger link number 4088 represented in binary as 111111111000.

Figure 7C:
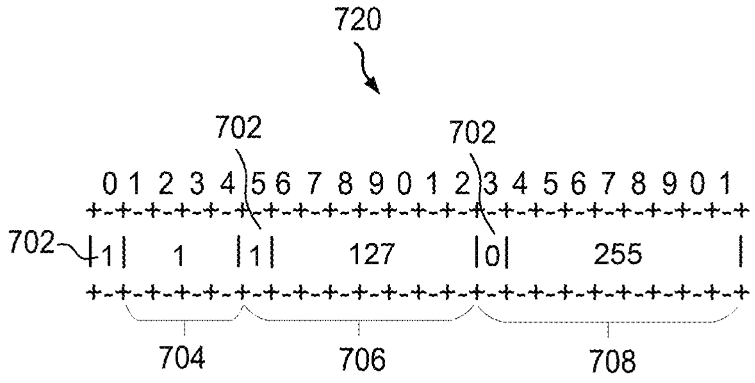
FIG. 7C is a link number field of an rSID having two extended fields according to an embodiment of the disclosure.

FIG. 7C is a link number field 720 of an rSID having the basic field 704 and first and second extended fields 706, 708 according to an embodiment of the disclosure. By way of example, the basic field 704 may be four bits, the first extended field 706 may be seven bits, and the second extended field 708 may be eight bits. When the link number is too large to be represented by the basic field 704 and the extended field 706 of FIG. 7B, the value of the E flag in the E flag field 702 in the first extended field 706 is set to 1 to indicate that the link number of the rSID comprises the basic field 704, the first extended field 706, and the second extended field 708. The four bits from the basic field 704, the seven bits of the first extended field 706, and the eight extended bits from the second extended field 708 provide a combined nineteen bits, which is sufficient to include even larger link numbers.

As shown in FIG. 7C, the value of the E flag in the E field 702 in the second extended field 706 is set to 0 to indicate that no further extended fields are included in the link number field 720.

Figure 8:
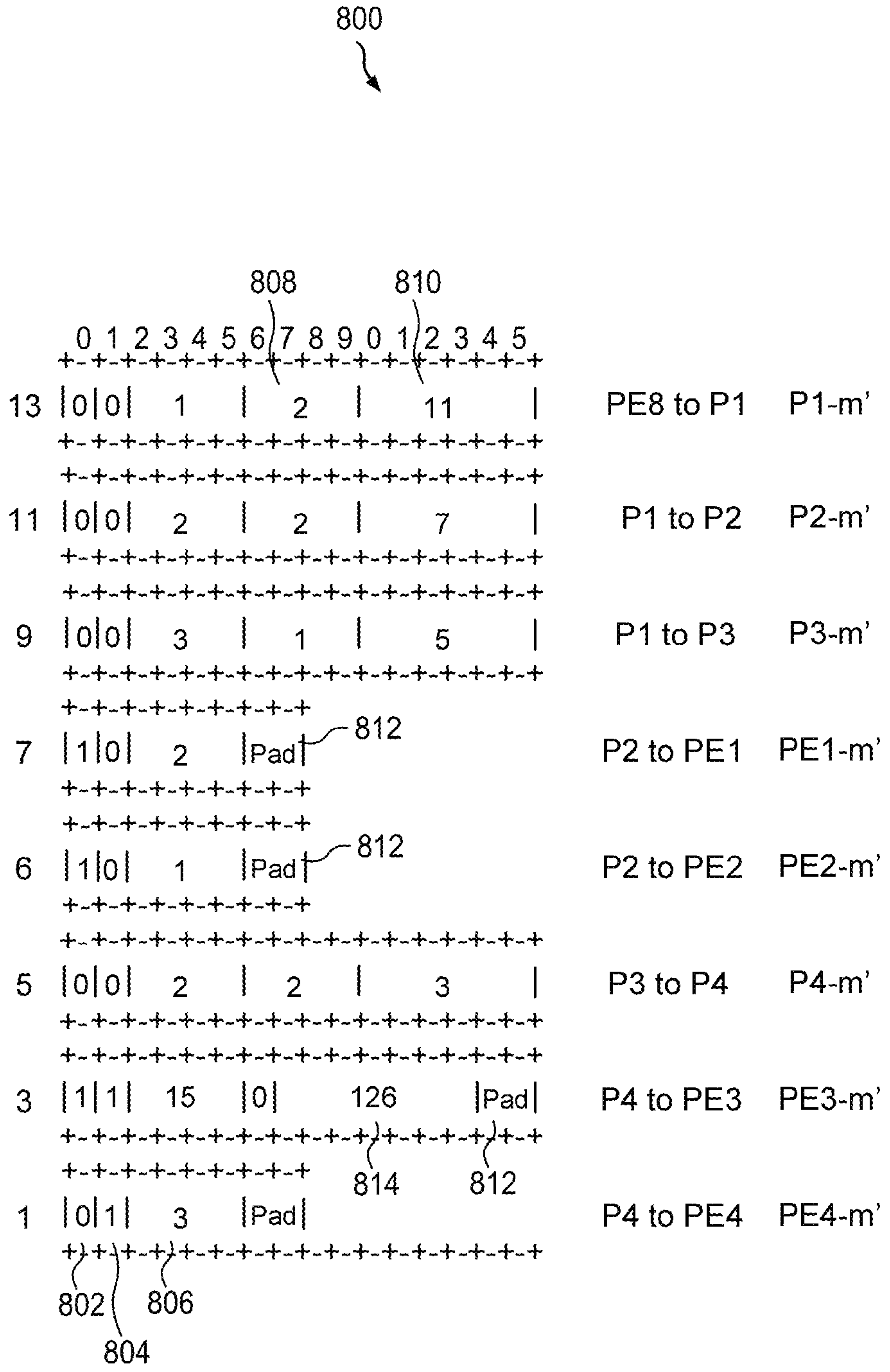
FIG. 8 is an encoding sub-tree from an ingress network node via a next hop to egress nodes using the L flag and the E flag according to an embodiment of the disclosure.

FIG. 8 is an encoding sub-tree 800 from an ingress network node via a next hop to egress nodes using the L flag and the E flag according to an embodiment of the disclosure. In the illustrated embodiment, the ingress network node is PE8, the next hop is P1, and the egress nodes are PE1 to PE4.

In an embodiment, an rSID comprises an L flag field 802, an E flag field 804, and a basic field 806. In an embodiment, the E flag field 804 and the basic field 806 collectively represent a link field. The rSID also comprises a number of branches field 808, a size of rSIDs field 810, one or more padding fields 812, and an extended field 814. In an embodiment, the padding fields 812 are used for simplicity (e.g., so that a corresponding rSID has an even 8 bits, or 1 byte).

By way of example, assume that the L flag field 802, the E flag field 804, and the basic field 806 collectively occupy 6 bits, that the number of branches field 808 occupies 4 bits, and that the size of rSIDs field 810 occupies 6 bits. The size of the rSID for a link to a transit node is 16 bits, which is 2 bytes. The size of the rSID for a link to a leaf node is 8 bits (including the 2 bits in the padding field 812), which is 1 byte.

Assume that the local link number for the link from P4 to leaf PE3 is 2046, which is too big to be represented by 4 bits in the basic field 806 of the link number field. As such, 2046 is represented by 4 bits in the basic field 806 with value of 15, and 7 bits in the first extended field 814 with value of 126. As shown, the rSID PE3-*m*' for the link from P4 to PE3 occupies a total of 2 bytes, which includes 2 bits in the padding field 812.

Still referring to FIG. 8, the S-rSIDs field 810 in P1-*m*' is 11 (bytes), which is the size of the 7 rSIDs (i.e., P2-*m*', P3-*m*', PE1-*m*', PE2-*m*', P4-*m*', PE3-*m*', PE4-*m*') encoding the sub-trees from P1 towards PE1 to PE4. The S-rSIDs field 810 in P2-*m*' is 7 (bytes), which is the size of the 5 rSIDs (i.e., PE1-*m*', PE2-*m*', P4-*m*', PE3-*m*', PE4-*m*') encoding the sub-trees from P2 and the rSIDs following them. The S-rSIDs field 810 in P3-*m*' is 5 (bytes), which is the size of the 5 rSIDs (i.e., P4-*m*', PE3-*m*', PE4-*m*') encoding the sub-trees from P3 and the rSIDs following them. The S-rSIDs field 810 in P4-*m*' is 3 (bytes), which is the size of the 2 rSIDs (i.e., PE3-*m*', PE4-*m*') encoding the sub-trees from P4 and the rSIDs following them.

FIG. 9 is a multicast neighbor SID table 900 of a node according to an embodiment of the disclosure. In an embodiment, the node is P1 in FIG. 1. As shown, the multicast neighbor SID table 900 includes a link number field 902 and a multicast SID locator of next hop field 904. The link number field 902 includes a link number of a link from the node to a next hop node, and the multicast SID locator of next hop field 904 includes a multicast SID locator of a next hop of P1.

As shown in FIG. 1, P1 has three links, namely a link 150 from P1 to PE8, a link 150 from P1 to P2 and link 150 from P1 to P3. These three links 150 have local link numbers 1, 2, and 3, respectively, on P1. The multicast neighbor SID table 900 comprises a row and a multicast SID locator for each of the local link numbers. The first row comprises link number 1 (for the link 150 from P1 to PE8) and PE8'*s* multicast SID locator. The second row comprises link number 2 (for the link 150 from P1 to P2) and P2'*s* multicast SID locator. The third row comprises link number 3 (for the link 150 from P1 to P3) and P3'*s* multicast SID locator. Using link number 1, PE8'*s* multicast SID locator is obtained from the multicast neighbor SID table 900. Using link number 2, P2'*s* multicast SID locator is obtained from the multicast neighbor SID table 900. Using link number 3, P3'*s* multicast SID locator is obtained from the multicast neighbor SID table 900.

The multicast SID locator of a next hop is a multicast node SID locator of the next hop node in one embodiment. For example, P2'*s* multicast SID locator is P2'*s* multicast node SID locator. In another embodiment, the multicast SID locator of a next hop is a multicast adjacency SID locator of the next hop node. For example, P3'*s* multicast SID locator is P3'*s* multicast adjacency SID locator.

The procedure or behavior on an ingress network node (PE8) without using the L flag is discussed.

For a packet to be transported by a SR P2MP path 160 as shown in FIG. 1, the ingress node (e.g., PE8) of the SR P2MP path 160 duplicates the packet for each sub-tree of the SR P2MP path 160 branching from the ingress node. The ingress node then sends the packet to the next hop along the sub-tree as follows.

The ingress node sets a destination address (DA)'s locator to the multicast SID locator of the next hop node along the sub-tree. Assume that the multicast SID locator indicates that the segment list in a segment routing header (SRH) comprises the rSIDs. The ingress node then sets the DA's rSID part to the rSID with the number of branches and the size of rSIDs for the link from the ingress to the next hop node, and sets the segment left (SL) to the number of normal segments whose space just enough for the size of rSIDs (a.k.a., Sr). Thereafter, the ingress node pushes the compact segment list encoding the sub-tree into the packet and sends the packet to the next hop node.

In an embodiment, the compact segment list is similar to the encoding sub-tree 500 shown in FIG. 5. For example, there are two sub-trees branching from PE8 of the SR P2MP path 160 in FIG. 1. The first sub-tree is from PE8 via P1 towards PE1 to PE4. The second sub-tree is from PE8 to PE5. In one embodiment, the contents of the rSIDs P1-*m*', P2-*m*', P3-*m*', PE1-*m*', PE2-*m*', P4-*m*', PE3-*m*', PE4-*m*' shown in FIG. 5 are used in the compact segment list.

For the first sub-tree, PE8 duplicates the packet, sets the DA to P1-*m*'s locator with P1-*m*', sets the source address (SA) to PE8, and pushes the compact segment list without P1-*m*' (i.e., <P2-*m*', P3-*m*', PE1-*m*', PE2-*m*', P4-*m*', PE3-*m*', PE4-*m*'>) with SL=the number of normal segments whose space is just enough for storing the rSIDs for encoding the sub-trees from P1. For example, the SL is the smallest integer greater than or equal to the size of the rSIDs (Sr) divided by Length-SID, where Length-SID is the length of a normal SID, which is 16 bytes or 128 bits. In an embodiment, SL is computed by SL=((S-rSIDs+Length-SID-1)/Length-SID). Thus, SL=(14+16−1)/16=1). Once SL has been computed, PE8 sends the packet to the DA (i.e., P1).

For the second sub-tree, PE8 duplicates the packet, sets the DA to PE5-*m*'s locator, sets DA's rSID to the rSID for the link from PE8 to PE5, sets SL to 0, and sends the packet to the DA (i.e., node PE5).

PE8 sends P1 the packet below, wherein the r-SID P1-*m*' comprises NB (N-Branches)=2 and Sr (S-rSIDs)=14:

SA=PE8,DA=<P1-*m*'s locator,P1-*m*' w/NB=2,Sr=14>) (<P2-*m*', P3-*m*', PE1-*m*', PE2-*m*', P4-*m*', PE3-*m*', PE4-*m*'>; SL=1) Data In the packet above, P1-*m*' has two branches, namely a first sub-tree including P2-*m*', PE1-*m*', PE2-*m*' and a second sub-tree including P3-*m*', P4-*m*', PE3-*m*', PE4-*m*'.

PE8 sends PE5 the packet below, wherein the rSID PE5-*m*' in DA comprises NB=0 and Sr=0, SL is 0:

(SA=PE8,DA=<PE5-*m*'s locator, PE5-*m*' w/NB=0, Sr=0>)(< >; SL=0) Data The procedure or behavior on an ingress network node (PE8) using the L flag is discussed.

For a packet to be transported by a SR P2MP path 160 as shown in FIG. 1, the ingress node (e.g., PE8) of the SR P2MP path 160 duplicates the packet for each sub-tree of the SR P2MP path 160 branching from the ingress node. The ingress node then sends the packet to the next hop along the sub-tree as follows.

The ingress node sets the DA's locator to the multicast SID locator of the next hop node along the sub-tree. Assume that the multicast SID locator indicates that the segment list in the SRH comprises the rSIDs.

For the rSID for the link to the next hop node, when the L flag in the rSID has a value of 1 (i.e., L==1), indicating the next hop is a leaf, there is no rSID part in the DA and the ingress node sets the SL in the SRH to 0. Otherwise, the L flag in the rSID has a value of 0 (i.e., L==0), indicating the next hop is a transit node. The ingress node sets DA's rSID part to the rSID with number of branches and the size of the rSIDs. The ingress node also sets the SL to the number of normal segments whose space is just enough for the size of rSIDs.

The ingress node pushes the compact segment list encoding the sub-tree into the packet and sends the packet to the next hop node.

In an embodiment, the compact segment list is a compact segment list with the L flag as described herein. In another embodiment, the compact segment list is a compact segment list with the L flag and the E flag as described herein.

For example, there are two sub-trees branching from PE8 of the SR P2MP path 160 in FIG. 1. The first sub-tree is from PE8 via P1 towards PE1 to PE4. The second sub-tree is from PE8 to PE5. In one embodiment, the contents of the rSIDs P1-*m*', P2-*m*', P3-*m*', PE1-*m*', PE2-*m*', P4-*m*', PE3-*m*', PE4-*m*' shown in FIG. 5 are used in the compact segment list.

For the first sub-tree, PE8 duplicates the packet, sets the DA to P1-*m*'s locator with P1-*m*', sets the SA to PE8, and pushes the compact segment list without P1-*m*' (i.e., <P2-*m*', P3-*m*', PE1-*m*', PE2-*m*', P4-*m*', PE3-*m*', PE4-*m*'>) with SL=the number of normal segments whose space is just enough for storing the rSIDs for encoding the sub-trees from P1. For example, SL is the smallest integer greater than or equal to the size of the rSIDs (Sr) divided by Length-SID, where Length-SID is the length of a normal SID, which is 16 bytes or 128 bits. In an embodiment, SL is computed by SL=((Sr+Length-SID-1)/Length-SID). Thus, SL=(10+16−1)/16=1). Once SL has been computed, PE8 sends the packet to DA (i.e., node P1).

For the second sub-tree, PE8 duplicates the packet, sets the DA to PE5-*m*'s locator, sets SL to 0, and sends the packet to DA (i.e., node PE5).

PE8 sends P1 the packet below, wherein the r-SID P1-*m*' comprises NB (N-Branches)=2 and Sr (S-rSIDs)=10:

(SA=PE8,DA=<P1-*m*'s locator, P1-*m*' w/NB=2,Sr=10>) (<P2-*m*', P3-*m*', PE1-*m*', PE2-*m*', P4-*m*', PE3-*m*', PE4-*m*'>; SL=1) Data In the packet above, P1-*m*' has two branches, namely a first sub-tree including P2-*m*', PE1-*m*', PE2-*m*' and a second sub-tree including P3-*m*', P4-*m*', PE3-*m*', PE4-*m*'.

PE8 sends PE5 the packet below, wherein DA has no rSID and SL is 0:

(SA=PE8,DA=<PE5-*m*'s locator>)(< >; SL=0) Data

The procedure or behavior on a transit node is discussed.

When a transit node (e.g., P1) of the SR P2MP path 160 receives a packet to be transported by the SR P2MP path 160, the DA of the packet is a multicast SID of the node, the DA comprises the rSID for the link to the node with NB and Sr, and the packet contains a segment list for the sub-trees from the node.

In an embodiment, the compact segment list is similar to the encoding sub-tree 500 shown in FIG. 5. In an embodiment, the segment list is a compact segment list with the L flag as described herein. In an embodiment, the segment list is a compact segment list with the L flag and the E flag as described herein. The DA and the segment list comprise the information for encoding the sub-trees from/under the transit node.

For example, when P1 receives a packet transported by the SR P2MP path 160, the packet's DA is a multicast SID of P1 and the segment list is <P2-*m*', P3-*m*', PE1-*m*', PE2-*m*', P4-*m*', PE3-*m*', PE4-*m*'> with SL=1. In one embodiment, the contents of the rSIDs P1-*m*', P2-*m*', P3-*m*', PE1-*m*', PE2-*m*', P4-*m*', PE3-*m*', PE4-*m*' as shown in FIG. 5.

The procedure or behavior on a transit node without using the L flag is discussed.

The transit node duplicates the packet for each sub-tree or next hop node from/under the node. The transit node then sets the DA of the packet to the multicast SID of the next hop node along the sub-tree. The transit node obtains the multicast SID locator of the next hop (MSL-NH) from the multicast neighbor SID table of the node using the link number derived from the Link-No field in the rSID for the link from the node to the next hop, such as P2-*m*'. The transit node sets DA's locator to MSL-NH, sets DA's rSID part to the rSID with NB (N-Branches) and Sr (S-rSIDs) for the link from the node to the next hop node such as P2-*m*', and sets SL in SRH to the number of normal segments whose space is just enough for storing Sr (units such as bytes), and sends the packet to DA (i.e., the next hop node).

For example, for the encoding of the SR P2MP path in FIG. 5, P1 duplicates the packet for next hop P2 or the first sub-tree towards PE1 and PE2, sets DA to <P2-*m*'s locator, P2-*m*' w/NB=2, Sr=10>, and sets SL in SRH to 1 (1 normal segment's space (16 bytes), which is just enough for storing Sr=10 bytes of rSIDs). P1 then sends the packet to DA (i.e., P2).

P1 duplicates the packet for next hop P3 or the second sub-tree towards PE3 and PE4, sets DA to <P3-*m*'s locator, P3-*m*' w/NB=1, Sr=6>, and sets SL in SRH to 1 (1 normal segment's space (16 bytes) for storing S-rSIDs=6 bytes of rSIDs). P1 then sends the packet to DA (i.e., P3).

P1 receives the following packet:

(SA=PE8,DA=<P1-*m*'s locator, P1-*m*' w/NB=2,Sr=14>) (<P2-*m*', P3-*m*', PE1-*m*', PE2-*m*', P4-*m*', PE3-*m*', PE4-*m*'>; SL=1) Data P1 duplicates the packet for P2 and P3, and sends the following packet to P2:

(SA=PE8, DA=<P2-*m*'s locator, P2-*m*' w/NB=2,Sr=10>) (<PE1-*m*', PE2-*m*', P4-*m*', PE3-*m*', PE4-*m*'>;SL=1) Data P1 also sends the following packet to P3:

(SA=PE8, DA=<P3-*m*'s locator, P3-*m*' w/NB=1,Sr=6>) (<P4-*m*', PE3-*m*', PE4-*m*'>;SL=1) Data After receiving the packet, P2 duplicates packet for PE1, sets DA to <PE1-*m*'s locator, PE1-*m*' w/NB=0, Sr=0>, sets SL to 0, and sends the following packet to PE1:

(SA=PE8, DA=<PE1-*m*'s locator,PE1-*m*' w/NB=0, Sr=0>)(< >;SL=0) Data to PE1

P2 duplicates packet for PE2, sets DA to <PE2-*m*'s locator, PE2-*m*' w/NB=0, Sr=0>, sets SL to 0, and sends the following packet to PE2:

(SA=PE8, DA=<PE2-*m*'s locator,PE2-*m*' w/NB=0, Sr=0>)(< >;SL=0) Data The behavior of multicast SID without considering the L flag is executed by transit node N when the DA of the packet received by N is N's Multicast SID. This is a variant of the endpoint behavior in Section 4.1 of Internet Engineering Task Force (IETF) Request for Comments (RFC) 8986 entitled "Segment Routing over IPv6 (SRv6) Network Programming" by C. Filsfils, et al., published February 2021, with the change from S13-S15 to S13a-S15b. This change duplicates the packet for each of NB next hop nodes, branches or sub-trees from/under N, sends the duplicated packet to the next hop node along the branch through setting the DA of the duplicated packet to the multicast SID locator of the next hop node with the rSID for the link from N to the next hop node, SL in SRH according to the S-rSIDs in the rSID, and submitting the duplicated packet to the egress IPv6 FIB lookup for transmission to the new destination DA (i.e., the next hop). The multicast SID locator is obtained from the multicast neighbor SID table of N using the link number derived from the Link-No field in the rSID for the link from N to the next hop node. The SL is set to the number of normal SIDs whose space is just enough to store S-rSIDs (units such as bytes) in the rSID for the link from N to the next hop node.

FIG. 10 is an example of pseudocode 1000 for processing a segment routing header (SRH) without using the L flag according to an embodiment of the disclosure.

FIG. 11 is an example of pseudocode 1100 for processing an SRH using the L flag according to an embodiment of the disclosure.

Figure 12:
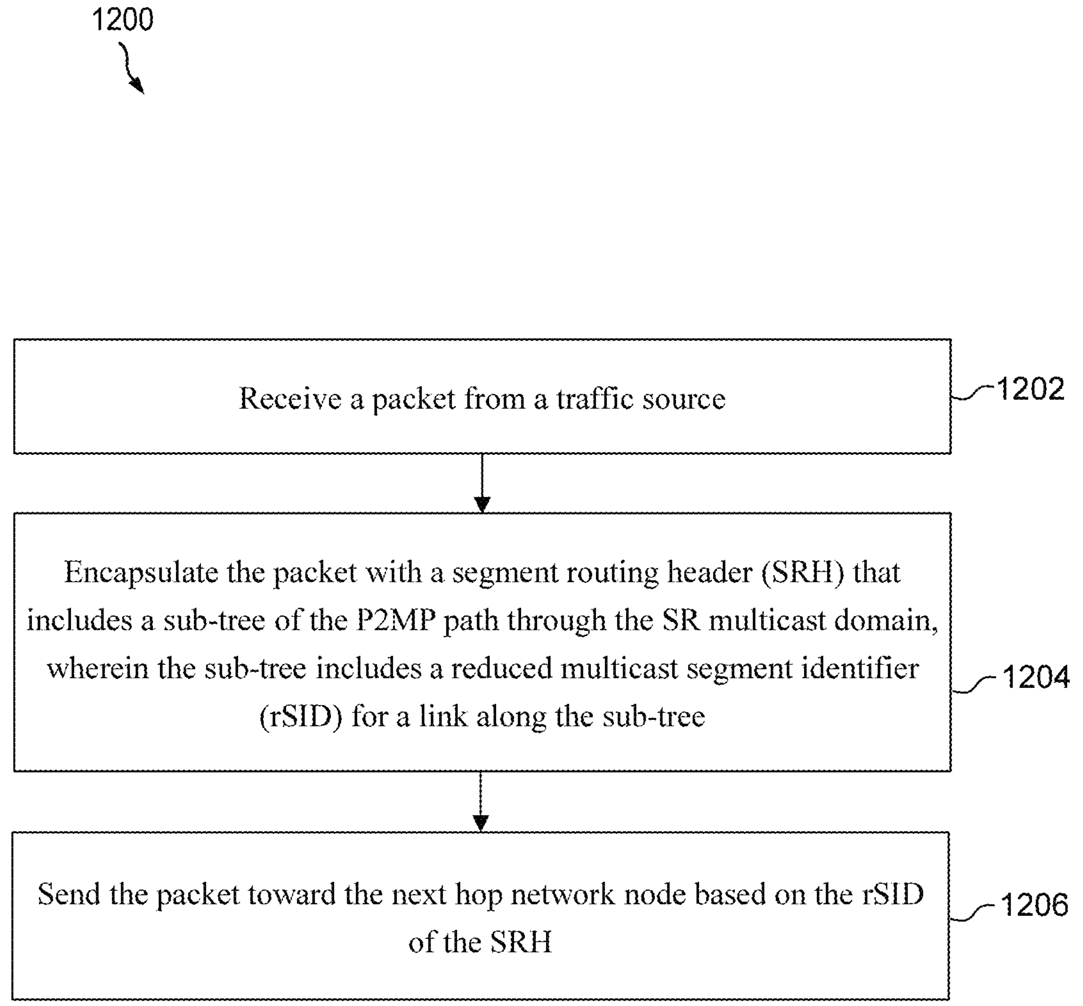
FIG. 12 is a method implemented by an ingress network node in the SR multicast domain along a P2MP path according to an embodiment of the disclosure.

FIG. 12 is a method 1200 implemented by an ingress network node in the SR multicast domain along a P2MP path according to an embodiment of the disclosure. The method 1200 may be performed to route a packet through a multicast domain.

In block 1202, the ingress network node receives a packet from a traffic source. In block 1204, the ingress network node encapsulates the packet with a segment routing header (SRH) that includes a sub-tree of the P2MP path through the SR multicast domain. In an embodiment, the sub-tree includes a reduced multicast segment identifier (rSID) for a link along the sub-tree.

In block 1206, the ingress network node sends the packet toward the next hop network node based on the rSID of the SRH.

In an embodiment, the method further comprises duplicating the packet to generate a copy of the packet, encapsulating the copy of the packet with a second SRH that includes a second sub-tree of the P2MP path through the SR multicast domain, and sending the copy of the packet toward the second next hop network node. In an embodiment, the second sub-tree includes a second rSID for a link along the second sub-tree.

In an embodiment, the method 1200 further comprises setting a destination address (DA) of the packet to include: a multicast segment identifier (SID) locator of the next hop network node along the sub-tree, and the rSID for the link along the sub-tree. In an embodiment, the rSID includes a link number (Link-No) of the link along the sub-tree, a number of branches (N-Branches) of the next hop network node along the sub-tree, and a size of rSIDs (S-rSIDs) for rSIDs starting from a rSID for a first link from the next hop network node along the sub-tree.

In an embodiment, the rSID is about two bytes and includes a Link-No field, an N-Branches field, and an S-rSIDs field.

In an embodiment, the Link-No field includes a value indicating the link number of the link along the sub-tree, the N-Branches field includes a value indicating the number of branches of the next hop network node along the sub-tree, and the S-rSIDs field includes a value indicating the size of the rSIDs starting from the rSID for the first link from the next hop network node along the sub-tree.

In an embodiment, the sub-tree includes a third rSID with an L flag, and wherein, when the L flag is set to a first value, the L flag indicates that the third rSID is for a link to a leaf node, that the third rSID has no corresponding N-Branches field, and that the third rSID has no corresponding S-rSIDs field.

In an embodiment, the sub-tree includes a fourth rSID with an E flag, and wherein, when the E flag is set to a first value, the E flag indicates that a Link-No field of the fourth rSID has been extended relative to a size of the Link-No field of the rSID.

In an embodiment, the SRH includes a segment left (SL) set to a number of normal segments used for the S-rSIDs field in the rSID for the link along the sub-tree and rSIDs for links for sub-trees from the next hop network node along the P2MP path, and wherein each of the normal segments comprises 16 bytes.

The procedure or behavior on an egress node is discussed.

When an egress node of a SR P2MP path receives a packet transported by the P2MP path, the DA of the packet is the Multicast SID of the egress node and SL=0. The egress node proceeds to process the next header in the packet (refer to S03 in Section 4.1 of RFC 8986).

The techniques disclosed herein can be deployed in any router and switch, which are used by the service providers around world, to improve network scalability and/or efficiency.

Figure 13:
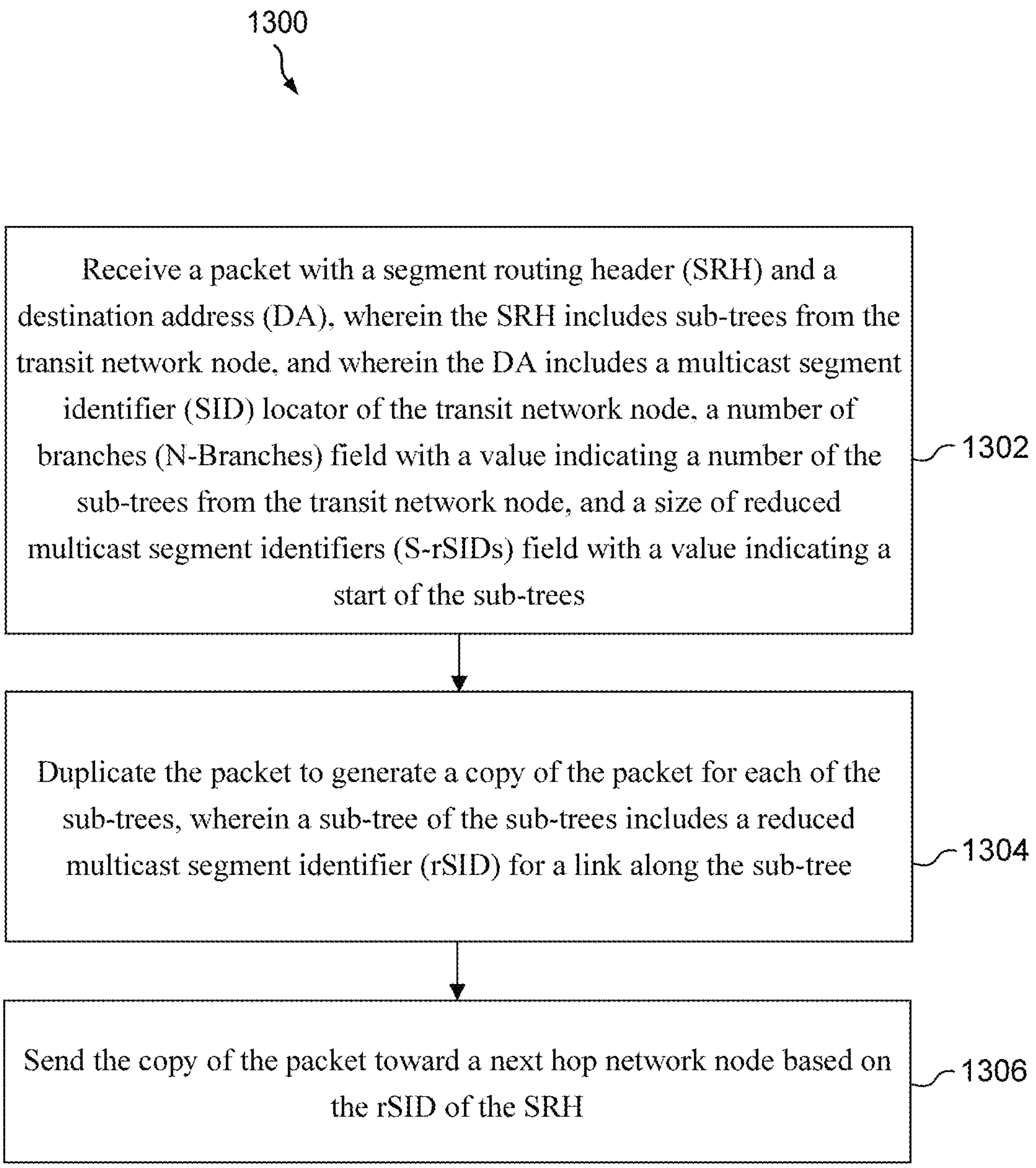
FIG. 13 is a method implemented by a transit network node in the SR multicast domain along a P2MP path according to an embodiment of the disclosure.

FIG. 13 is a method 1300 implemented by a transit network node in the SR multicast domain along a P2MP path according to an embodiment of the disclosure. The method 1300 may be performed to route a packet through a multicast domain.

In block 1302, the transit node receives a packet with a segment routing header (SRH) and a destination address (DA). In an embodiment, the SRH includes sub-trees from the transit network node. In an embodiment, the DA includes a multicast segment identifier (SID) locator of the transit network node, a number of branches (N-Branches) field with a value indicating a number of the sub-trees from the transit network node, and a size of a reduced multicast segment identifiers (S-rSIDs) field with a value indicating a start of the sub-trees.

In block 1304, the transit node duplicates the packet to generate a copy of the packet for each of the sub-trees. In an embodiment, a sub-tree of the sub-trees includes a reduced multicast segment identifier (rSID) for a link along the sub-tree.

In block 1306, the transit node sends the copy of the packet toward the next hop network node based on the rSID.

In an embodiment, the method 1300 further comprises setting a DA of the copy of packet to include an SID locator of the next hop network node along the sub-tree and the rSID for the link along the sub-tree. In an embodiment, the SID locator is obtained from a neighbor SID table of the transit network node using a link number in the rSID. In an embodiment, the rSID includes a number of branches (N-Branches) of the next hop network node along the sub-tree a nd a size of rSIDs (S-rSIDs) for rSIDs starting from an rSID for a first link from the next hop node along the sub-tree.

In an embodiment, the rSID is about two bytes and the rSID consists of a link number (Link-No) field, a number of branches (N-Branches) field, and a size of rSIDs (S-rSIDs) field.

In an embodiment, the Link-No field includes a value indicating a link number for a link along the sub-tree, the N-Branches field includes a value indicating a number of branches of the next hop network node along the sub-tree, and the S-rSIDs field includes a value indicating a size of the rSIDs starting from the rSID for the first link from the next hop node along the sub-tree.

In an embodiment, the sub-tree includes a second rSID with an L flag. In an embodiment, when the L flag is set to a first value, the L flag indicates that the second rSID is for a link to a leaf node, that the second rSID has no corresponding N-Branches field, and that the second rSID has no corresponding S-rSIDs field.

In an embodiment, the sub-tree includes a third rSID with an E flag, and wherein, when the E flag is set to a first value, the E flag indicates that a Link-No field of the third rSID has been extended relative to a size of the Link-No field of the rSID.

In an embodiment, the SRH of the copy of the packet includes a segment left (SL) set to a number of normal segments used for the S-rSIDs field in the rSID for the link along the sub-tree and rSIDs for links for sub-trees from the next hop network node along the P2MP path, and wherein each of the normal segments comprises 16 bytes.

Figure 14:
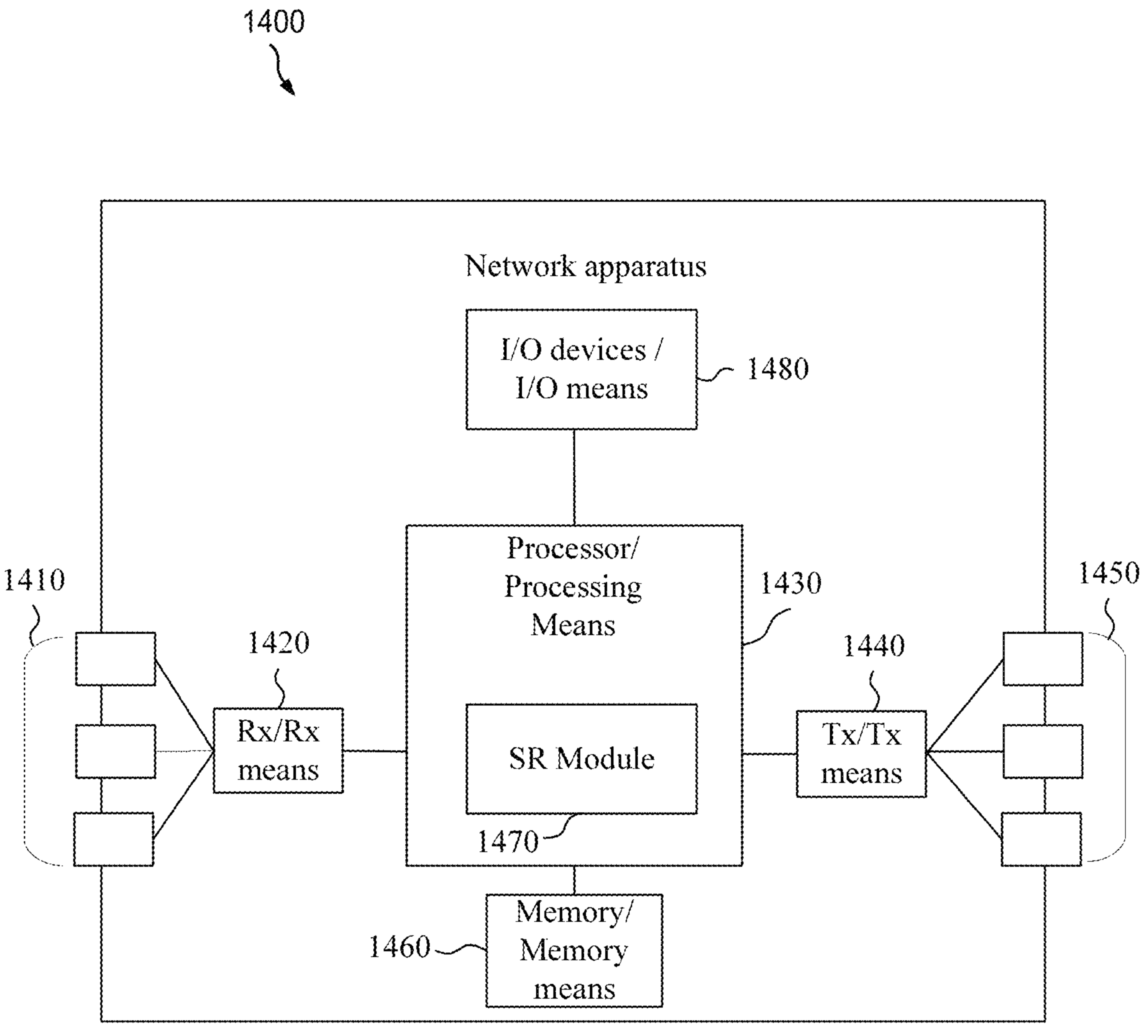
FIG. 14 is a schematic diagram of a network apparatus according to an embodiment of the disclosure.

FIG. 14 is a schematic diagram of a network apparatus 1400 (e.g., an ingress network node, a transit node, etc.) according to an embodiment of the disclosure. The network apparatus 1400 is suitable for implementing the disclosed embodiments as described herein. The network apparatus 1400 comprises ingress ports/ingress means 1410 (a.k.a., upstream ports) and receiver units (Rx)/receiving means 1420 for receiving data; a processor, logic unit, or central processing unit (CPU)/processing means 1430 to process the data; transmitter units (Tx)/transmitting means 1440 and egress ports/egress means 1450 (a.k.a., downstream ports) for transmitting the data; and a memory/memory means 1460 for storing the data. The network apparatus 1400 may also comprise optical-to-electrical (OE) components and electrical-to-optical (EO) components coupled to the ingress ports/ingress means 1410, the receiver units/receiving means 1420, the transmitter units/transmitting means 1440, and the egress ports/egress means 1450 for egress or ingress of optical or electrical signals.

The processor/processing means 1430 is implemented by hardware and software. The processor/processing means 1430 may be implemented as one or more CPU chips, cores (e.g., as a multi-core processor), field-programmable gate arrays (FPGAs), application specific integrated circuits (ASICs), and digital signal processors (DSPs). The processor/processing means 1430 is in communication with the ingress ports/ingress means 1410, receiver units/receiving means 1420, transmitter units/transmitting means 1440, egress ports/egress means 1450, and memory/memory means 1460. The processor/processing means 1430 comprises an SR module 1470. The SR module 1470 is able to implement the methods disclosed herein. The inclusion of the SR module 1470 therefore provides a substantial improvement to the functionality of the network apparatus 1400 and effects a transformation of the network apparatus 1400 to a different state. Alternatively, the SR module 1470 is implemented as instructions stored in the memory/memory means 1460 and executed by the processor/processing means 1430.

The network apparatus 1400 may also include input and/or output (I/O) devices or I/O means 1480 for communicating data to and from a user. The I/O devices or I/O means 1480 may include output devices such as a display for displaying video data, speakers for outputting audio data, etc. The I/O devices or I/O means 1480 may also include input devices, such as a keyboard, mouse, trackball, etc., and/or corresponding interfaces for interacting with such output devices.

The memory/memory means 1460 comprises one or more disks, tape drives, and solid-state drives and may be used as an over-flow data storage device, to store programs when such programs are selected for execution, and to store instructions and data that are read during program execution. The memory/memory means 1460 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by an ingress network node in a segment routing (SR) multicast domain along a point-to-multipoint (P2MP) path, comprising:
- receiving a packet from a traffic source;
- encapsulating the packet with a segment routing header (SRH) that includes a sub-tree of the P2MP path through the SR multicast domain, wherein the sub-tree includes a reduced multicast segment identifier (rSID) for a link along the sub-tree; and
- sending the packet toward a next hop network node based on the rSID of the SRH;
- duplicating the packet to generate a copy of the packet;
- encapsulating the copy of the packet with a second SRH that includes a second sub-tree of the P2MP path through the SR multicast domain, wherein the second sub-tree includes a second rSID for a link along the second sub-tree; and
- sending the copy of the packet toward a second next hop network node based on the second rSID.

2. The method of claim 1, further comprising setting a destination address (DA) of the packet to include:
- a multicast segment identifier (SID) locator of the next hop network node along the sub-tree, and
- the rSID for the link along the sub-tree, wherein the rSID includes a link number (Link-No) of the link along the sub-tree, a number of branches (N-Branches) of the next hop network node along the sub-tree, and a size of rSIDs (S-rSIDs) for rSIDs starting from an rSID for a first link from the next hop network node along the sub-tree.

3. The method of claim 1, wherein the rSID is about two bytes and includes a link number (Link-No) field, a number of branches (N-Branches) field, and a size of rSIDs (S-rSIDs) field.

4. The method of claim 3, wherein the Link-No field includes a value indicating a link number of the link along the sub-tree, the N-Branches field includes a value indicating the number of branches of the next hop network node along the sub-tree, and the S-rSIDs field includes a value indicating a size of the rSIDs starting from the rSID for a first link from the next hop network node along the sub-tree.

5. The method of claim 1, wherein the sub-tree includes a third rSID with an L flag, and wherein, when the L flag is set to a first value, the L flag indicates that the third rSID is for a link to a leaf node, that the third rSID has no corresponding N-Branches field, and that the third rSID has no corresponding S-rSIDs field.

6. The method of claim 1, wherein the sub-tree includes a fourth rSID with an E flag, and wherein, when the E flag is set to a first value, the E flag indicates that a Link-No field of the fourth rSID has been extended relative to a size of the Link-No field of the rSID.

7. The method of claim 1, wherein the SRH includes a segment left (SL) set to a number of normal segments used for a size of rSIDs (S-rSIDs) field in the rSID for the link along the sub-tree and rSIDs for links for sub-trees from the next hop network node along the P2MP path, and wherein each of the normal segments comprises 16 bytes.

8. A method implemented by a transit network node in a segment routing (SR) multicast domain along a point-to-multipoint (P2MP) path, comprising:
- receiving a packet with a segment routing header (SRH) and a destination address (DA), wherein the SRH includes sub-trees from the transit network node, and wherein the DA includes a multicast segment identifier (SID) locator of the transit network node, a number of branches (N-Branches) field with a value indicating a number of the sub-trees from the transit network node, and a size of a reduced multicast segment identifiers (S-rSIDs) field with a value indicating a start of the sub-trees;
- duplicating the packet to generate a copy of the packet for each of the sub-trees, wherein a sub-tree of the sub-trees includes a reduced multicast segment identifier (rSID) for a link along the sub-tree; and
- sending the copy of the packet toward a next hop network node based on the rSID.

9. The method of claim 8, further comprising setting a DA of the copy of the packet to include:
- a SID locator of the next hop network node along the sub-tree, wherein the SID locator is obtained from a neighbor SID table of the transit network node using a link number in the rSID; and
- the rSID for the link along the sub-tree, wherein the rSID includes a number of branches (N-Branches) of the next hop network node along the sub-tree and a size of rSIDs (S-rSIDs) for rSIDs starting from an rSID for a first link from the next hop network node along the sub-tree.

10. The method of claim 8, wherein the rSID is about two bytes and the rSID consists of a link number (Link-No) field, a number of branches (N-Branches) field, and a size of rSIDs (S-rSIDs) field.

11. The method of claim 10, wherein the Link-No field includes a value indicating a link number for a link along the sub-tree, the N-Branches field includes a value indicating a number of branches of the next hop network node along the sub-tree, and the S-rSIDs field includes a value indicating a size of the rSIDs starting from the rSID for a first link from the next hop network node along the sub-tree.

12. The method of claim 8, wherein the sub-tree includes a second rSID with an L flag, and wherein, when the L flag is set to a first value, the L flag indicates that the second rSID is for a link to a leaf node, that the second rSID has no corresponding N-Branches field, and that the second rSID has no corresponding S-rSIDs field.

13. The method of claim 9, wherein the sub-tree includes a third rSID with an E flag, and wherein, when the E flag is set to a first value, the E flag indicates that a Link-No field of the third rSID has been extended relative to a size of the Link-No field of the rSID.

14. The method of claim 8, wherein the SRH of the copy of the packet includes a segment left (SL) set to a number of normal segments used for a size of rSIDs (S-rSIDs) field in the rSID for the link along the sub-tree and rSIDs for links for sub-trees from the next hop network node along the P2MP path, and wherein each of the normal segments comprises 16 bytes.

15. An ingress network node in a segment routing (SR) multicast domain along a point-to-multipoint (P2MP) path, comprising:

a memory storing instructions; and a processor coupled to the memory, the processor configured to execute the instructions to cause the ingress network node to:

receive a packet from a traffic source;

encapsulate the packet with a segment routing header (SRH) that includes a sub-tree of the P2MP path through the SR multicast domain, wherein the sub-tree includes a reduced multicast segment identifier (rSID) for a link along the sub-tree;

send the packet toward a next hop network node based on the rSID of the SRH;

duplicate the packet to generate a copy of the packet;

encapsulate the copy of the packet with a second SRH that includes a second sub-tree of the P2MP path through the SR multicast domain, wherein the second sub-tree includes a second rSID for a link along the second sub-tree; and send the copy of the packet toward a second next hop network node based on the second rSID.

16. The ingress network node of claim 15, wherein the processor is further configured to set a destination address (DA) of the packet to include:

a multicast segment identifier (SID) locator of the next hop network node along the sub-tree, and the rSID for the link along the sub-tree, wherein the rSID includes a link number (Link-No) of the link along the sub-tree, a number of branches (N-Branches) of the next hop network node along the sub-tree, and a size of rSIDs (S-rSIDs) for rSIDs starting from an rSID for a first link from the next hop network node along the sub-tree.

17. The ingress network node of claim 15, wherein the rSID is about two bytes and includes a link number (Link-No) field, a number of branches (N-Branches) field, and a size of rSIDs (S-rSIDs) field.

18. The ingress network node of claim 17, wherein the Link-No field includes a value indicating a link number of the link along the sub-tree, the N-Branches field includes a value indicating the number of branches of the next hop network node along the sub-tree, and the S-rSIDs field includes a value indicating a size of the rSIDs starting from the rSID for a first link from the next hop network node along the sub-tree.

19. The ingress network node of claim 15, wherein the sub-tree includes a third rSID with an L flag, and wherein, when the L flag is set to a first value, the L flag indicates that the third rSID is for a link to a leaf node, that the third rSID has no corresponding N-Branches field, and that the third rSID has no corresponding S-rSIDs field.

20. The ingress network node of claim 15, wherein the sub-tree includes a fourth rSID with an E flag, and wherein, when the E flag is set to a first value, the E flag indicates that a Link-No field of the fourth rSID has been extended relative to a size of the Link-No field of the rSID.

21. The ingress network node of claim 15, wherein the SRH includes a segment left (SL) set to a number of normal segments used for a size of rSIDs (S-rSIDs) in the rSID for the link along the sub-tree and rSIDs for links for sub-trees from the next hop network node along the P2MP path, and wherein each of the normal segments comprises 16 bytes.

22. A transit network node in a segment routing (SR) multicast domain along a point-to-multipoint (P2MP) path, comprising:

a memory storing instructions; and a processor coupled to the memory, the processor configured to execute the instructions to cause the transit network node to:

receive a packet with a segment routing header (SRH) and a destination address (DA), wherein the SRH includes sub-trees from the transit network node, and wherein the DA includes a multicast segment identifier (SID) locator of the transit network node, a number of branches (N-Branches) field with a value indicating a number of the sub-trees from the transit network node, and a size of a reduced multicast segment identifier (S-rSIDs) field with a value indicating a start of the sub-trees;

duplicate the packet to generate a copy of the packet for each of the sub-trees, wherein a sub-tree of the sub-trees includes a reduced multicast segment identifier (rSID) for a link along the sub-tree; and send the copy of the packet toward a next hop network node based on the rSID.

23. The transit network node of claim 22, wherein the processor is further configured to set a DA of the copy of the packet to include:

a SID locator of the next hop network node along the sub-tree, wherein the SID locator is obtained from a neighbor SID table of the transit network node using a link number in the rSID; and the rSID for the link along the sub-tree, wherein the rSID includes a number of branches (N-Branches) of the next hop network node along the sub-tree and a size of rSIDs (S-rSIDs) for rSIDs starting from an rSID for a first link from the next hop network node along the sub-tree.

24. The transit network node of claim 22, wherein the rSID is about two bytes and consists of a link number (Link-No) field, a number of branches (N-Branches) field, and a size of rSIDs (S-rSIDs) field.

25. The transit network node of claim 24, wherein the Link-No field includes a value indicating a link number for a link along the sub-tree, the N-Branches field includes a value indicating a number of branches of the next hop network node along the sub-tree and the S-rSIDs field includes a value indicating a size of the rSIDs starting from the rSID for a first link from the next hop network node along the sub-tree.

26. The transit network node of claim 22, wherein the sub-tree includes a second rSID with an L flag, and wherein, when the L flag is set to a first value, the L flag indicates that the second rSID is for a link to a leaf node, that the second rSID has no corresponding N-Branches field, and that the second rSID has no corresponding S-rSIDs field.

27. The transit network node of claim 22, wherein the sub-tree includes a third rSID with an E flag, and wherein, when the E flag is set to a first value, the E flag indicates that a Link-No field of the third rSID has been extended relative to a size of the Link-No field of the rSID.

28. The transit network node of claim 22, wherein the SRH of the copy of the packet includes a segment left (SL) set to a number of normal segments used for a size of rSIDs (S-rSIDs) field in the rSID for the link from the transit network node to the next hop network node along the sub-tree and rSIDs for links for sub-trees from the next hop network node along the P2MP path, and wherein each of the normal segments comprises 16 bytes.

* * * * *